US011250154B2

(12) United States Patent
Ould-Ahmed-Vall et al.

(10) Patent No.: US 11,250,154 B2
(45) Date of Patent: *Feb. 15, 2022

(54) INSTRUCTION EXECUTION THAT BROADCASTS AND MASKS DATA VALUES AT DIFFERENT LEVELS OF GRANULARITY

(71) Applicant: Intel Corporation, Santa Clara, CA (US)

(72) Inventors: Elmoustapha Ould-Ahmed-Vall, Chandler, AZ (US); Robert Valentine, Kiryat Tivon (IL); Jesus Corbal, Barcelona (ES); Bret L. Toll, Hillsboro, OR (US); Mark J. Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/730,686

(22) Filed: Dec. 30, 2019

(65) Prior Publication Data

US 2020/0134224 A1 Apr. 30, 2020

Related U.S. Application Data

(63) Continuation of application No. 16/141,283, filed on Sep. 25, 2018, now Pat. No. 10,909,259, which is a (Continued)

(51) Int. Cl.
*G06F 21/62* (2013.01)
*G06F 16/27* (2019.01)
(Continued)

(52) U.S. Cl.
CPC ...... *G06F 21/6227* (2013.01); *G06F 9/30018* (2013.01); *G06F 9/30032* (2013.01);
(Continued)

(58) Field of Classification Search
CPC .. G06F 21/6227; G06F 16/27; G06F 21/6254; G06F 21/70; G06F 9/30101;
(Continued)

(56) References Cited

U.S. PATENT DOCUMENTS 5,832,288 A 11/1998 Wong
6,006,315 A 12/1999 Park
(Continued)

FOREIGN PATENT DOCUMENTS

CN 1723454 A 1/2006
CN 1732447 A 2/2006
(Continued)

OTHER PUBLICATIONS

Official Letter, Search Report from the IP Office and English Version of the Search Report and Claims from counterpart Taiwan Patent Application No. 101148057, dated Jan. 12, 2015, 6 pages.
(Continued)

*Primary Examiner* — Michael Pham
(74) *Attorney, Agent, or Firm* — Nicholson De Vos Webster & Elliott LLP

(57) ABSTRACT

An apparatus is described that includes an execution unit to execute a first instruction and a second instruction. The execution unit includes input register space to store a first data structure to be replicated when executing the first instruction and to store a second data structure to be replicated when executing the second instruction. The first and second data structures are both packed data structures. Data values of the first packed data structure are twice as large as data values of the second packed data structure. The execution unit also includes replication logic circuitry to replicate the first data structure when executing the first instruction to create a first replication data structure, and, to replicate the second data structure when executing the second data
(Continued)

instruction to create a second replication data structure. The execution unit also includes masking logic circuitry to mask the first replication data structure at a first granularity and mask the second replication data structure at a second granularity. The second granularity is twice as fine as the first granularity.

20 Claims, 26 Drawing Sheets

Related U.S. Application Data continuation of application No. 15/245,113, filed on Aug. 23, 2016, now Pat. No. 10,083,316, which is a continuation of application No. 13/976,433, filed as application No. PCT/US2011/067095 on Dec. 23, 2011, now Pat. No. 9,424,327.

(51) Int. Cl.
  *G06F 21/70* (2013.01)
  *G06F 9/30* (2018.01)
  *G06F 9/38* (2018.01)

(52) U.S. Cl.
  CPC ...... *G06F 9/30036* (2013.01); *G06F 9/30101* (2013.01); *G06F 9/3802* (2013.01); *G06F 16/27* (2019.01); *G06F 21/6254* (2013.01); *G06F 21/70* (2013.01)

(58) Field of Classification Search
  CPC .............. G06F 9/3802; G06F 9/30032; G06F 9/30018; G06F 9/30036; G06F 15/00
  USPC .......................................... 707/626; 712/224
  See application file for complete search history.

(56) References Cited

U.S. PATENT DOCUMENTS

| | | | |
|---|---|---|---|
| 6,016,529 A | 1/2000 | Woodman | |
| 6,044,478 A | 3/2000 | Green | |
| 6,484,255 B1* | 11/2002 | Dulong | G06F 9/30018 710/30 |
| 6,845,412 B1 | 1/2005 | Boike et al. | |
| 7,228,401 B2 | 6/2007 | Moyer | |
| 8,775,375 B2 | 7/2014 | Holt et al. | |
| 2003/0093648 A1 | 5/2003 | Moyer | |
| 2004/0030863 A1 | 2/2004 | Paver et al. | |
| 2004/0054878 A1* | 3/2004 | Debes | G06F 17/147 712/221 |
| 2004/0148493 A1 | 7/2004 | Chu et al. | |
| 2007/0038798 A1 | 2/2007 | Bouchard et al. | |
| 2007/0130114 A1 | 6/2007 | Li et al. | |
| 2008/0229051 A1 | 9/2008 | Burns et al. | |
| 2009/0157994 A1 | 6/2009 | Hampel et al. | |
| 2009/0172365 A1* | 7/2009 | Orenstien | G06F 9/3842 712/225 |
| 2010/0262789 A1 | 10/2010 | Jan et al. | |
| 2013/0275730 A1 | 10/2013 | Ould-Ahmed-Vall et al. | |
| 2013/0283021 A1 | 10/2013 | Ould-Ahmed-Vall et al. | |
| 2013/0305020 A1 | 11/2013 | Valentine et al. | |
| 2013/0339664 A1 | 12/2013 | Ould-Ahmed-Vall et al. | |
| 2014/0016773 A1 | 1/2014 | Wolrich et al. | |

FOREIGN PATENT DOCUMENTS

| | | |
|---|---|---|
| CN | 1922797 A | 2/2007 |
| CN | 101036117 A | 9/2007 |
| CN | 101482810 A | 7/2009 |
| TW | 470914 B | 1/2002 |
| TW | 200413889 A | 8/2004 |
| TW | 200606715 A | 2/2006 |
| TW | 201123008 A | 7/2011 |

OTHER PUBLICATIONS

Final Office Action from U.S. Appl. No. 15/245,113, dated Oct. 19, 2017, 9 pages.
First Office Action and Search Report from foreign counterpart Chinese Patent Application No. 201180075876.7, dated Mar. 31, 2016, 14 pages.
First Office Action and Search Report from foreign counterpart Chinese Patent Application No. 201710258062.6, dated Sep. 5, 2018, 13 pages.
Intel Corporation, "Intel (Registered) Advanced Vector Extensions Programming Reference," http://www.intel.com, Reference# 319433-011, Jun. 30, 2011, 24 pages.
International Preliminary Reporton Patentability for Application No. PCT/US2011/067084, dated Jul. 3, 2014, 7 pages.
International Preliminary Reporton Patentability for Application No. PCT/US2011/067095, dated Jul. 3, 2014, 6 pages.
International Search Report and Written Opinion for Application No. PCT/US2011/067084, dated Aug. 29, 2012, 11 pages.
International Search Report and Written Opinion for Application No. PCT/US2011/067095, dated Sep. 12, 2012, 9 pages.
Non-Final Office Action from U.S. Appl. No. 13/976,433, dated Sep. 25, 2015, 22 pages.
Non-Final Office Action from U.S. Appl. No. 15/245,113, dated Apr. 10, 2017, 6 pages.
Notice of Allowance from foreign counterpart Taiwan Patent Application No. 101148057, dated May 30, 2016, 3 pages.
Notice of Allowance from Taiwan Patent Application No. 101148335, dated Nov. 27, 2015, 2 pages.
Notice of Allowance from U.S. Appl. No. 13/976,003, dated Dec. 21, 2015, 15 pages.
Notice of Allowance from U.S. Appl. No. 13/976,433, dated Apr. 15, 2016, 22 pages.
Notice of Allowance from U.S. Appl. No. 15/245,113, dated Apr. 4, 2018, 15 pages.
Notice on Grant of Patent Right for Invention from foreign counterpart Chinese Patent Application No. 201180075876.7, dated Jun. 26, 2017, 2 pages.
Notice on Grant of Patent right for invention from foreign counterpart Chinese Patent Application No. 201710258062.6, dated Apr. 10, 2019, 4 pages.
Office action and Search Report form Foreign Counterpart Taiwan Patent Application No. 101148057, dated Jan. 8, 2015, 14 pages. (Translation available only for Search Report).
Office Action and Search Report from Foreign Counterpart Taiwan Patent Application No. 101148335, dated Apr. 29, 2015, 9 pages.
Office Action from Foreign Counterpart Chinese Patent Application No. 201180076281.3, dated Dec. 22, 2015, 14 pages.
Office Action from Foreign Counterpart Taiwan Patent Application No. 101148057, dated Oct. 28, 2015, 7 pages.
Second Office Action from foreign counterpart Chinese Patent Application No. 201180075876.7, dated Dec. 15, 2016, 7 pages.
Second Office Action from foreign counterpart Chinese Patent Application No. 201180076281.3, dated Aug. 15, 2016, 14 pages.
Corrected Notice of Allowability, U.S. Appl. No. 16/141,283, dated Nov. 5, 2020, 3 pages.
Notice of Allowance, U.S. Appl. No. 16/141,283, dated Sep. 18, 2020, 10 pages.
Non-Final Office Action, U.S. Appl. No. 16/141,283, dated Apr. 6, 2020, 8 pages.
Non-Final Office Action, U.S. Appl. No. 16/730,782, dated Oct. 15, 2021, 16 pages.
Non-Final Office Action, U.S. Appl. No. 16/730,844, dated Oct. 7, 2021, 13 pages.
Notice of Allowance, U.S. Appl. No. 16/730,844, dated Nov. 22, 2021, 12 pages.
Notice of Allowance, U.S. Appl. No. 16/730,782, dated Nov. 22, 2021, 12 pages.

* cited by examiner

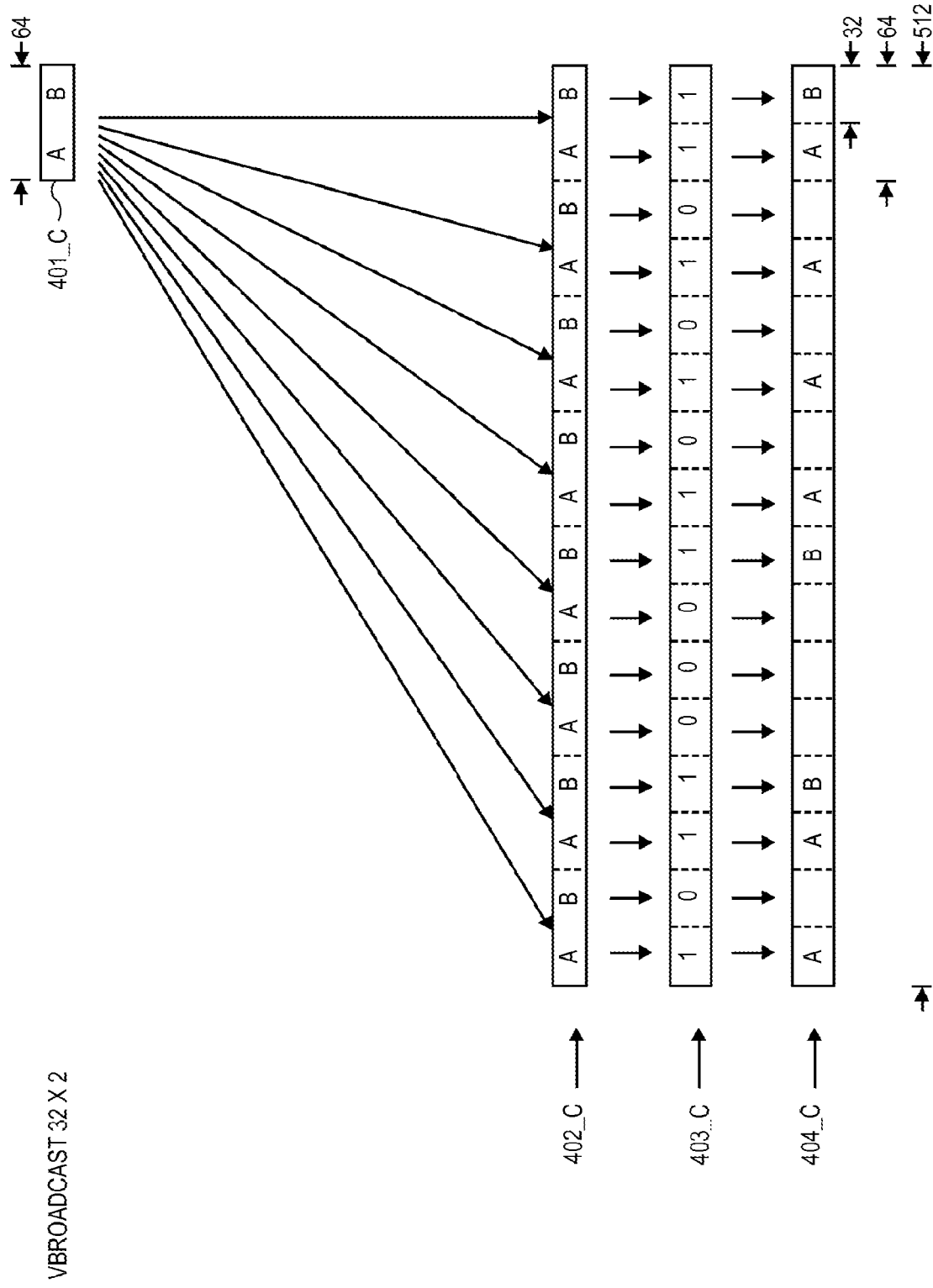

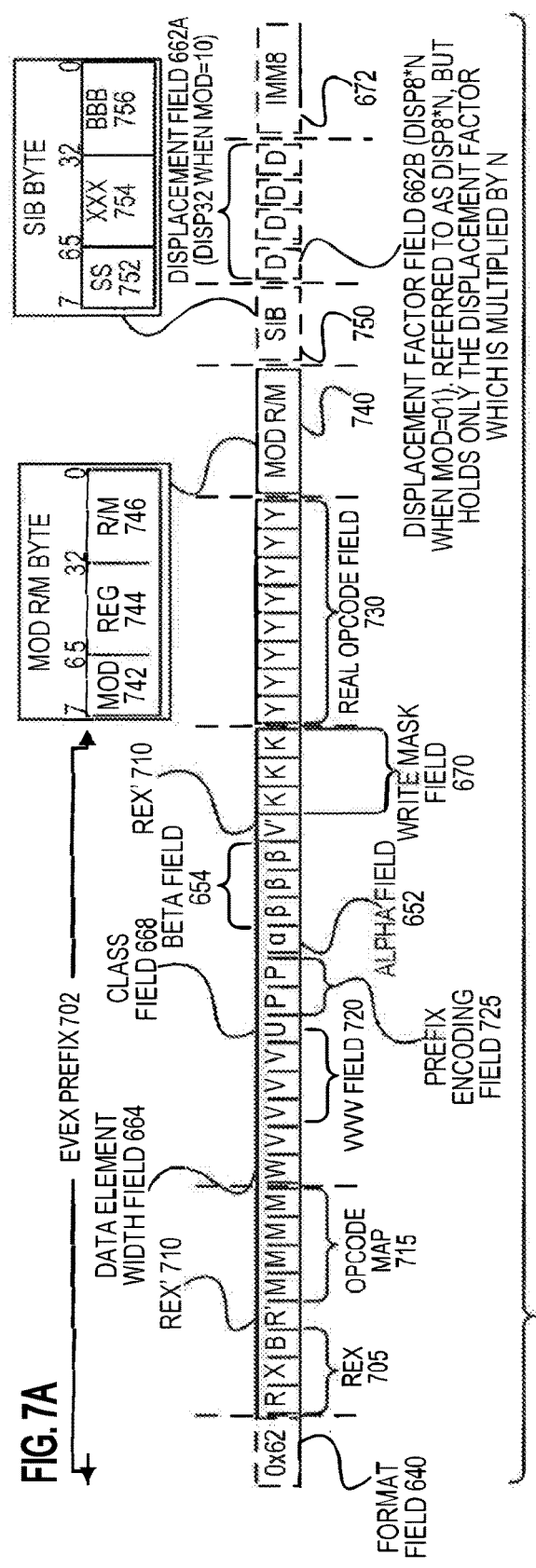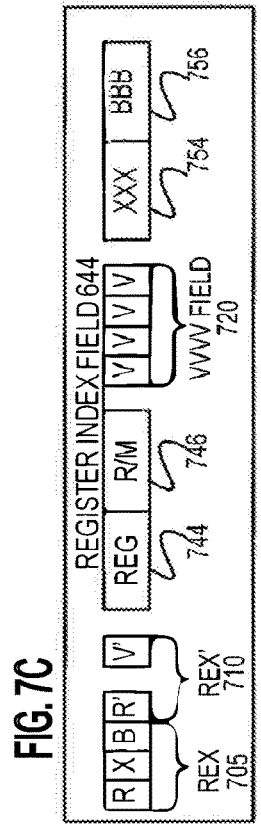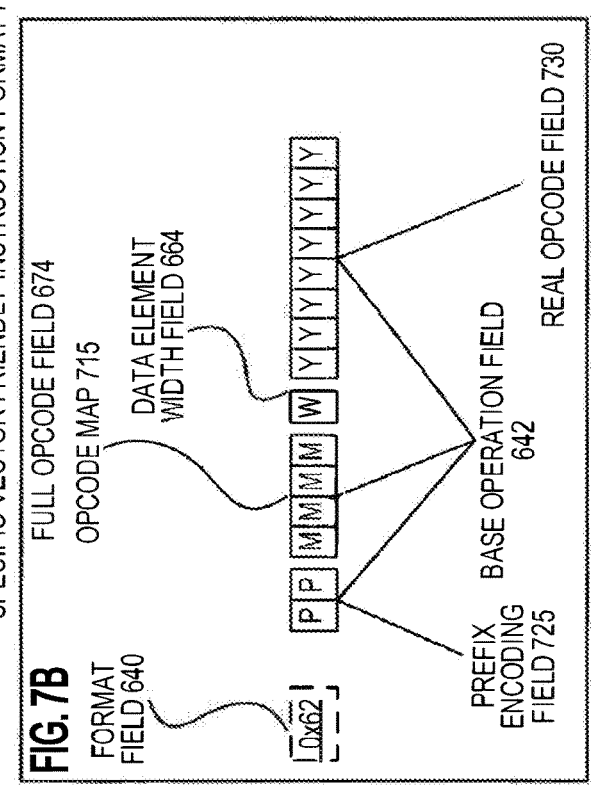

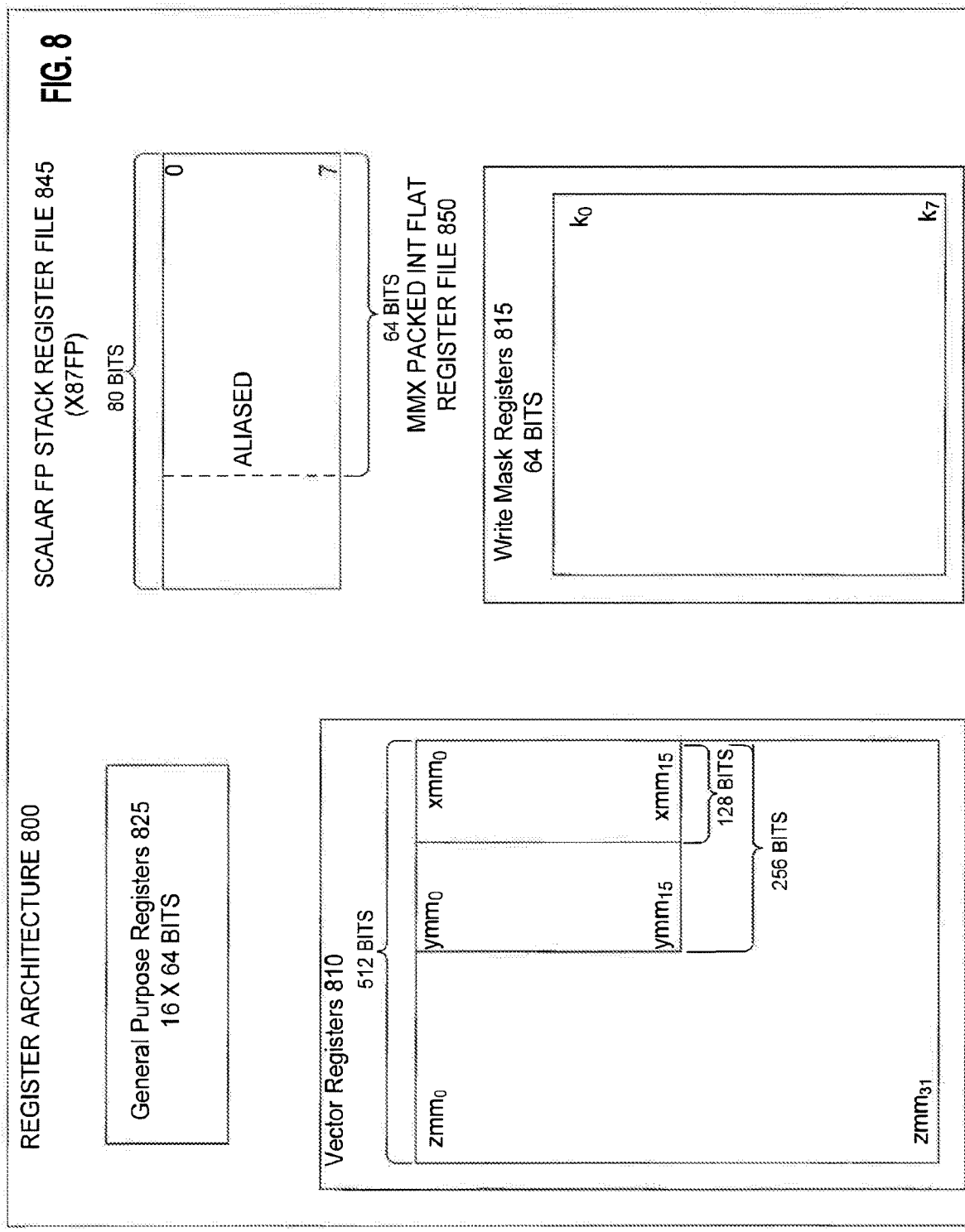

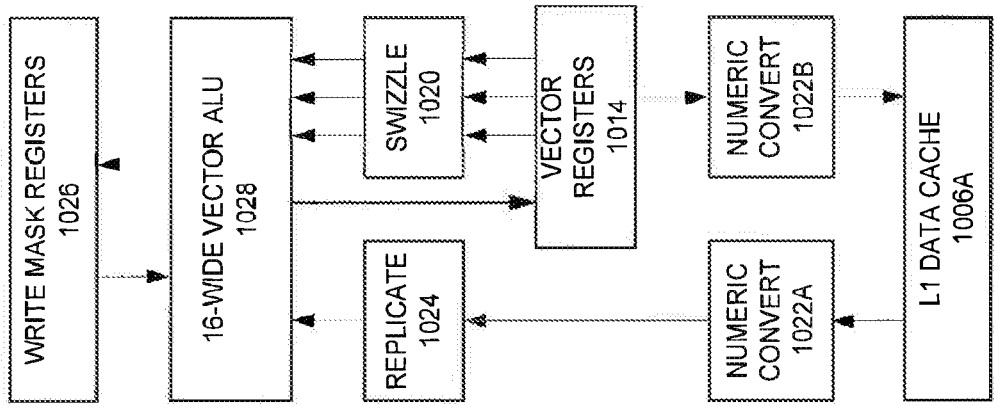
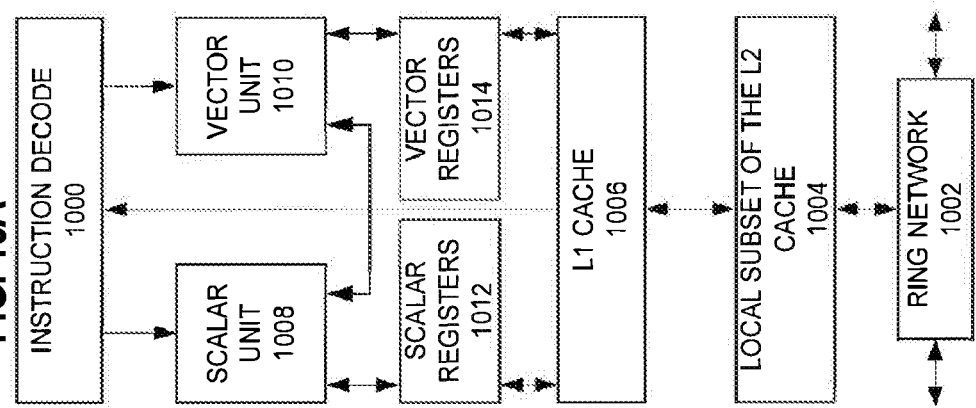

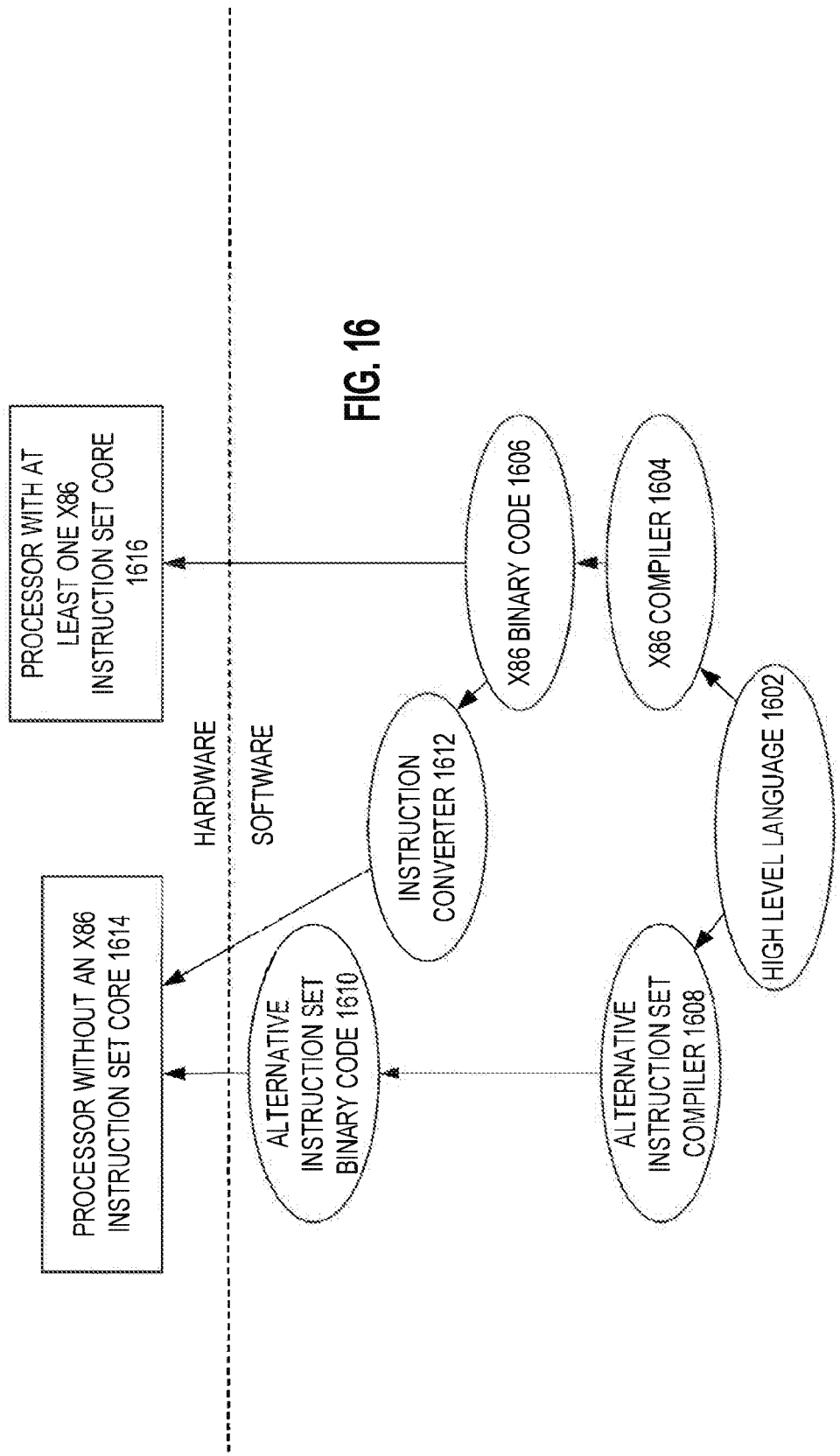

INSTRUCTION EXECUTION THAT BROADCASTS AND MASKS DATA VALUES AT DIFFERENT LEVELS OF GRANULARITY

CROSS-REFERENCE TO RELATED APPLICATIONS

The present patent application is a continuation application claiming priority from U.S. patent application Ser. No. 16/141,283, filed Sep. 25, 2018, and titled: "Instruction Execution that Broadcasts and Masks Data Values at Different Levels of Granularity", which is a continuation of U.S. patent application Ser. No. 15/245,113, filed Aug. 23, 2016, and titled: "Instruction Execution that Broadcasts and Masks Data Values at Different Levels of Granularity", now U.S. Pat. No. 10,083,316 issued on Sep. 25, 2018, which is a continuation of U.S. patent application Ser. No. 13/976, 433, now U.S. Pat. No. 9,424,327 issued on Aug. 23, 2016, whose § 371(c) date is Jun. 26, 2013, and titled: "Instruction Execution that Broadcasts and Masks Data Values at Different Levels of Granularity", which is a U.S. National Phase Application under 35 U.S.C. § 371 of International Application No. PCT/US2011/067095, filed Dec. 23, 2011, and titled: "Instruction Execution that Broadcasts and Masks Data Values at Different Levels of Granularity", all of which are incorporated herein by reference in their entirety.

FIELD OF INVENTION

The present invention pertains to the computing sciences generally, and, more specifically to an instruction execution that broadcasts and masks data values at different levels of granularity.

BACKGROUND

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., AB=C). By contrast, FIG. 2B shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 104 that is different that general purpose register space 102. Specifically, general purpose register space 102 is nominally used to store scalar values. As such, when, the any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, only one of these layers is actually implemented—although that is not a strict requirement. For any instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input data vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to effect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

FIGS. 3A to 3D show the logical operation of a number of prior art VBROADCAST instructions. A VBROADCAST instruction effectively replicates an data structure multiple times over into a result. Each of the prior art VBROADCAST instructions of FIGS. 3A through 3D were implemented on a vector processor architecture having a resultant vector data width of 256 bits.

FIG. 3A depicts a "256 bit" VBROADCASTSS instruction. As observed in FIG. 3A, the 256 bit VBROADCASTSS instruction reads a 32 bit single precision floating point data value from memory 301_A and replicates it eight times into the 256 bit destination 302_A.

FIG. 3B depicts a "128 bit" VBROADCASTSS instruction. As observed in FIG. 3B, the 128 bit VBROADCASTSS instruction reads a 32 bit single precision floating point data value from memory 301_B and replicates it four times into the 256 bit destination 302b. The four remaining 32 bit elements in the destination are written over with a value of zero.

FIG. 3C depicts a VBROADCASTSD instruction. As observed in FIG. 3C, the VBROADCASTSD instruction reads a 64 bit double precision floating point data value from memory 301_C and replicates it four times into the 256 bit destination 302_C.

FIG. 3D depicts a VBROADCASTF128 instruction. As observed in FIG. 3D, the VBROADCASTF128 instruction reads a 128 bit data word from memory 301_D and replicates it twice into the 256 bit destination 303d. The source operand 301_D can be a packed data structure having two 64 bit double precision floating point elements (depicted in FIG. 3D) or four 32 bit single precision floating point elements (not depicted in FIG. 3D).

BRIEF DESCRIPTION OF THE DRAWINGS

The present invention is illustrated by way of example and not limitation in the figures of the accompanying drawings, in which like references indicate similar elements and in which:

FIGS. 4A through 4G show improved VBROADCAST instructions;

FIGS. 7A-7D are block diagrams illustrating an exemplary specific vector friendly instruction format according to embodiments of the invention;

FIG. 8 is a block diagram of a register architecture according to one embodiment of the invention;

FIGS. 10A-B illustrate a block diagram of a more specific exemplary in-order core architecture, which core would be one of several logic blocks (including other cores of the same type and/or different types) in a chip;

FIG. 16 is a block diagram contrasting the use of a software instruction converter to convert binary instructions in a source instruction set to binary instructions in a target instruction set according to embodiments of the invention.

DETAILED DESCRIPTION

Overview

FIGS. 4A through 4F pertain to a new set of advanced VBROADCAST instructions. The new set of advanced VBROADCAST instructions are characterized by a write masking layer that permits masking at the granularity of the data element(s) within the data structure being replicated. For example, if the data structure being replicated is a 64 bit structure containing two 32 bit single precision values, the write mask will support masking at 32 bit granularity. Also, whereas the prior art VBROADCAST instructions discussed above in FIGS. 3A through 3D create a 256 bit result, by contrast, the improved VBROADCAST instructions of FIGS. 4A through 4F, create a 512 bit result. As will become evident in the following discussion, the expansion to a 512 bit result permits for significantly more complex replication patterns as compared to the prior art VBROADCAST instructions of FIGS. 3A through 3D.

Figure 4A:
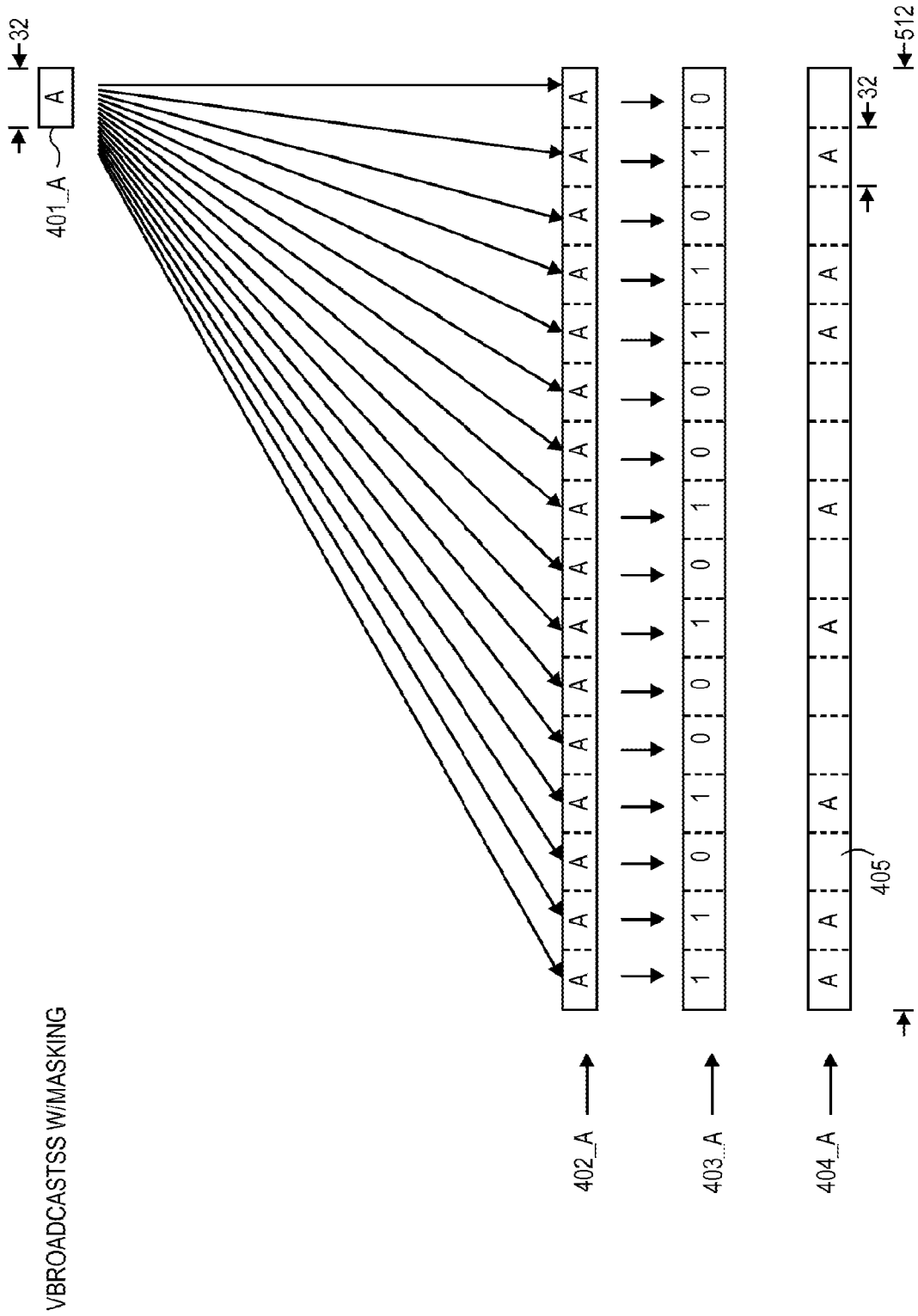

FIG. 4A shows a VBROADCASTSS instruction with masking. As observed in FIG. 4A, the VBROADCASTSS instruction replicates a 32 bit input data structure 401_A sixteen times to create a replication data structure 402_A. A masking layer 403_A applies a masking pattern to mask the replication data structure 402_A at 32 bit granularity to create the resultant data structure 404_A. It is understood that the resultant data structure is ultimately written to a destination register in vector register space. The address of the destination register is specified in a field of the instruction.

Figure 1:
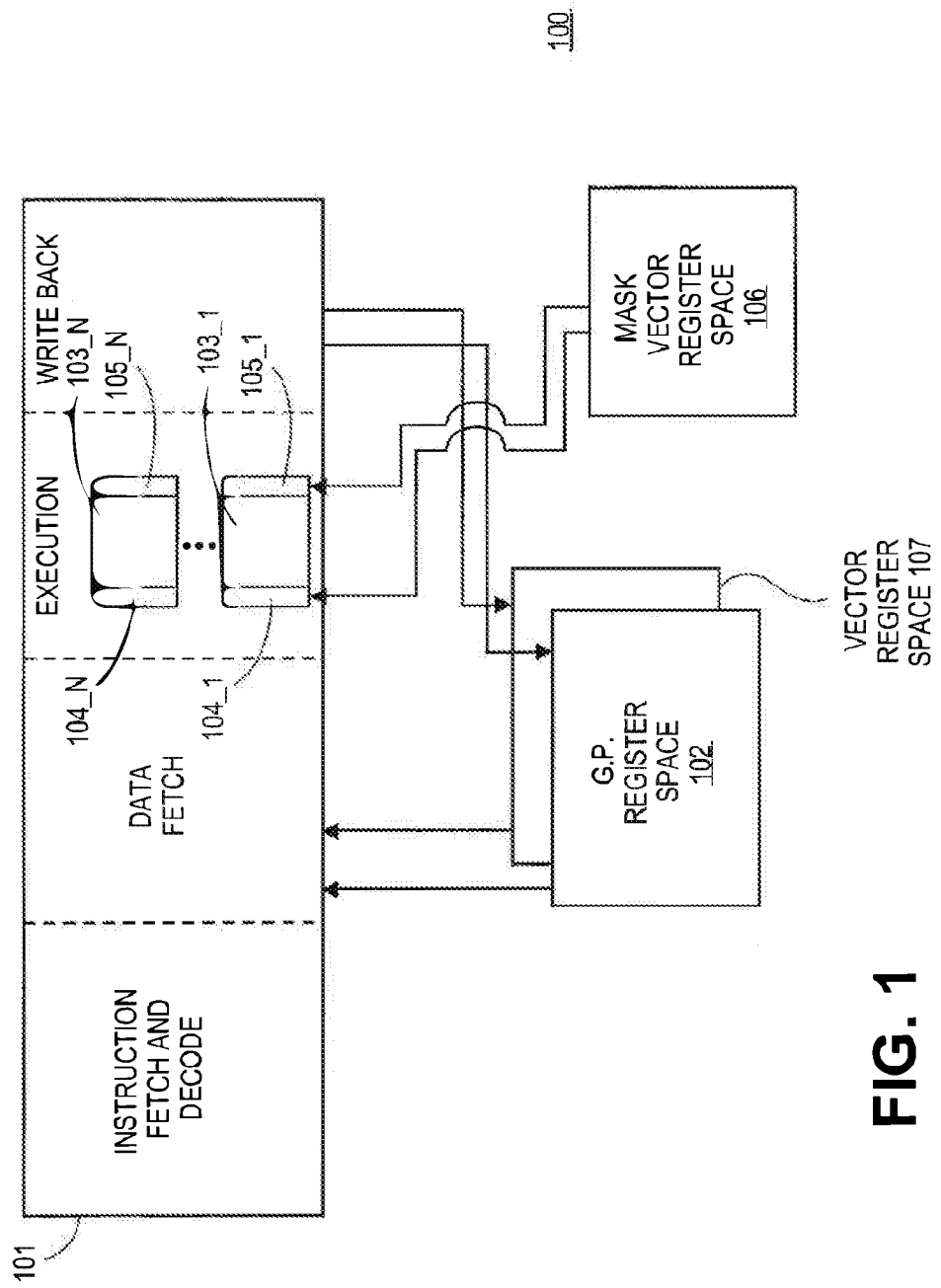
FIG. 1 shows an instruction execution pipeline.
Figure 2A:
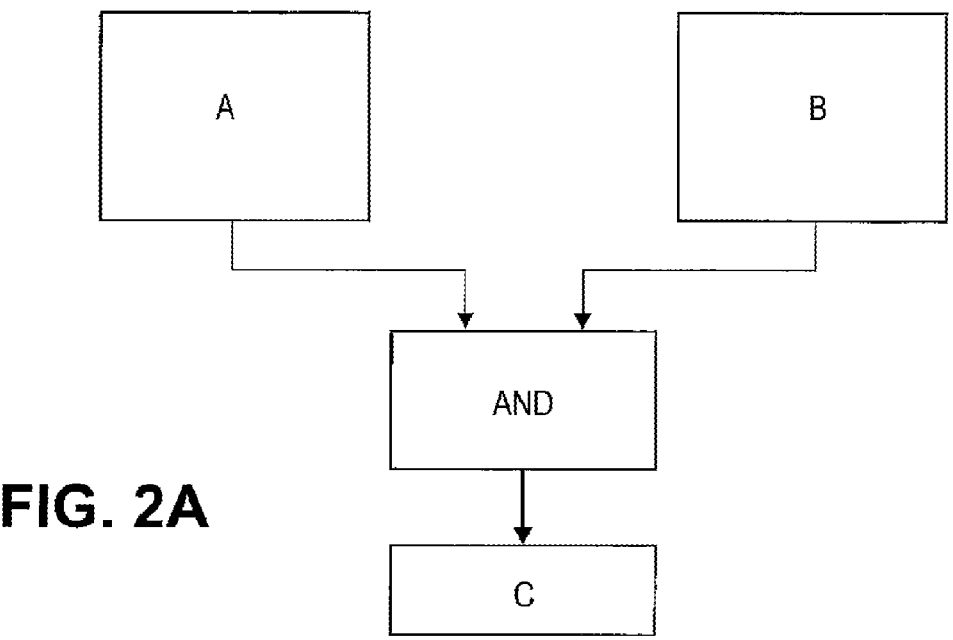
FIGS. 2A and 2B compare scalar vs. vector processing.
Figure 2B:
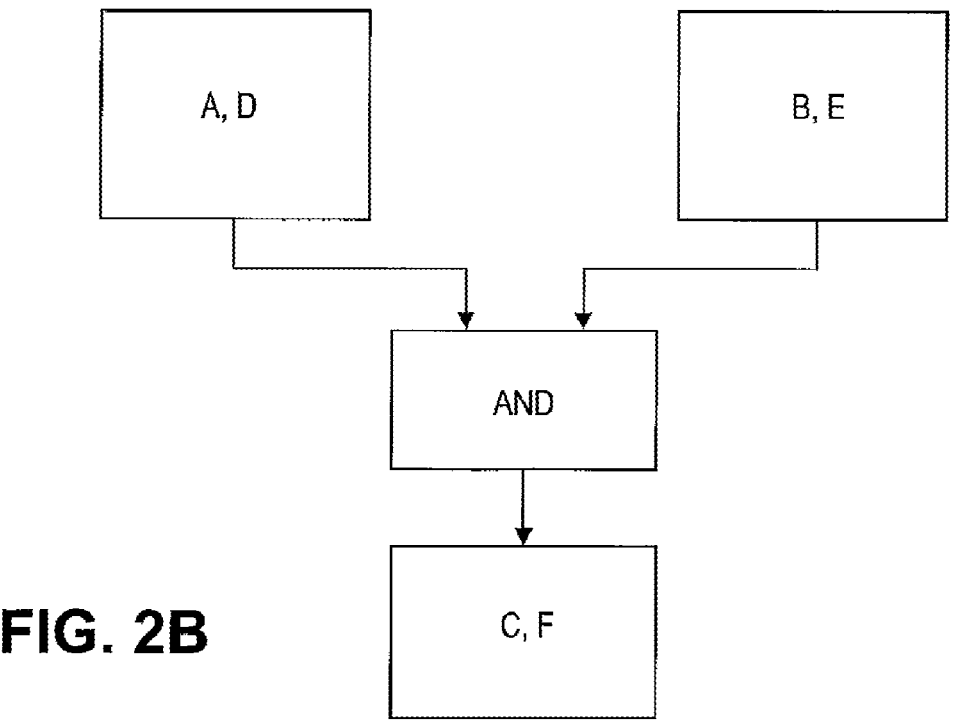
Figure 3A:
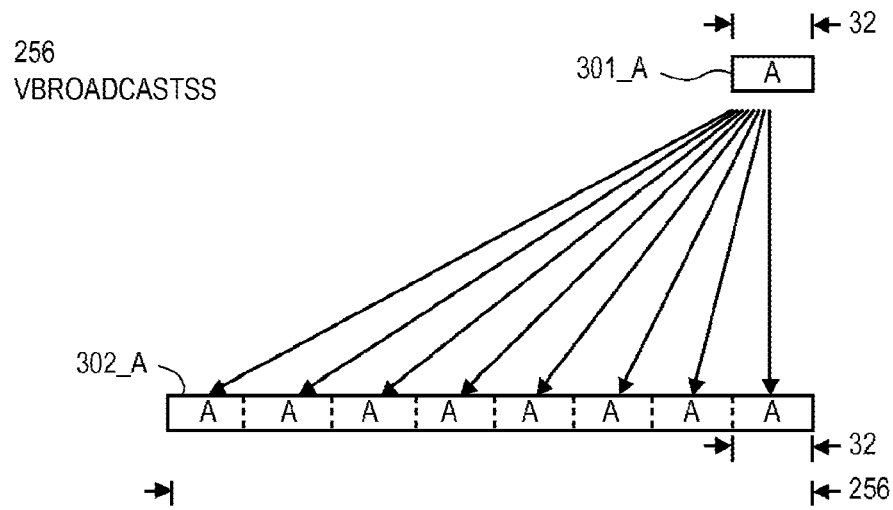
FIGS. 3A through 3D show prior art VBROADCAST instructions.
Figure 3B:
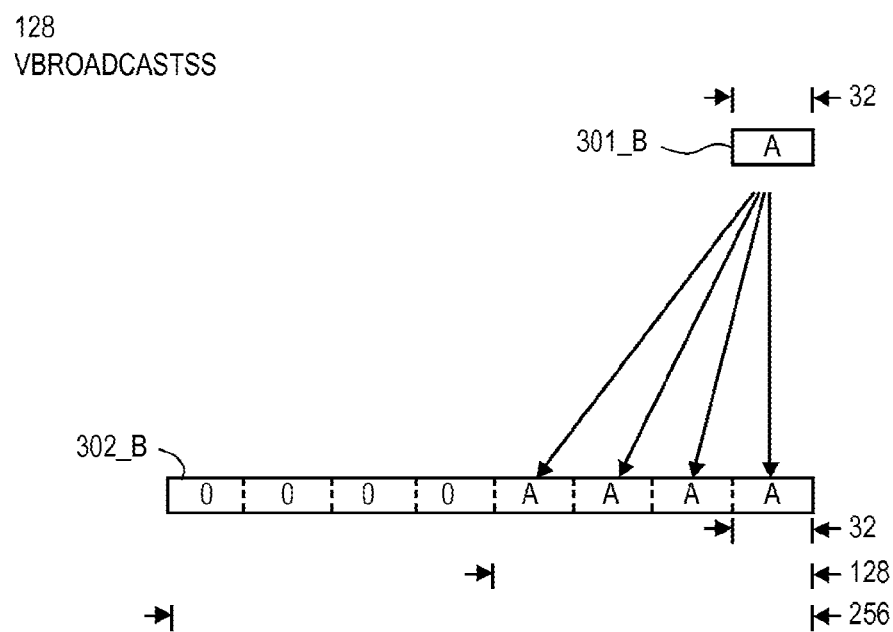
Figure 3C:
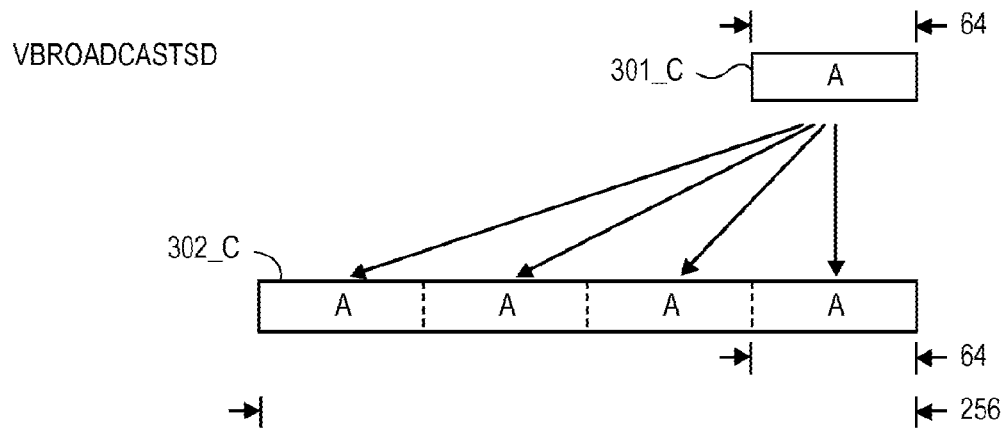
Figure 3D:
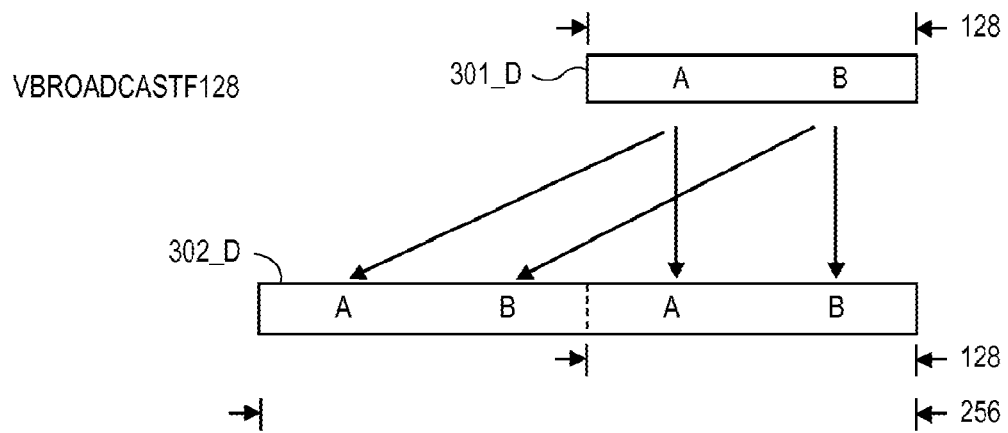

In an embodiment, the input data structure is a 32 bit single precision floating point value read from memory or extracted from (e.g., the rightmost element of) a vector source operand fetched from vector register space such as register space 107 of FIG. 1. In either case, the instruction format includes a field that identifies where the data structure to be replicated is to be found.

The specific pattern of 1s and 0s observed in the mask pattern of FIG. 4A is merely exemplary. One of ordinary skill will understand that any pattern of 1s and 0s consistent with the size of the mask may be utilized. In an embodiment, the mask pattern is embedded in the instruction itself (e.g., akin to an immediate operand). Alternatively, the mask pattern may be fetched from mask pattern register space such as register space 106 of FIG. 1. In the former case, the instruction format includes a field that contains the actual mask pattern, whereas, in the later case the instruction format includes a field that identifies from where the mask pattern is to be fetched.

In an implementation of a vector friendly instruction format, embodiments of which are described in more detail below, the instruction format supports both of these mask pattern techniques. In this case, the instruction format includes an additional field that identifies which approach is to be taken for the instruction (e.g., 1=mask pattern is akin to immediate operand embedded in the instruction, 0=mask pattern is to be fetched from mask register space). Separately or in combination, the type of masking applied may be "merged" or "zeroed". In the case of merged masking, a "masked out" field of the resultant data structure (such as field 405) is not written over. Rather, the original value in the destination register at that location is kept. By contrast, in the case of zeroed masking, a "masked out" field of the resultant data structure writes over that location in the destination register with a value of 0. In various embodiments (such as those associated with the vector friendly instruction format referred to just above), whether merged or zeroed masking to apply is specified in another field of the instruction format.

The above comments concerning masking also apply to the following discussion of the instructions associated with FIGS. 4B through 4F. For convenience they are not repeated below.

Figure 4B:
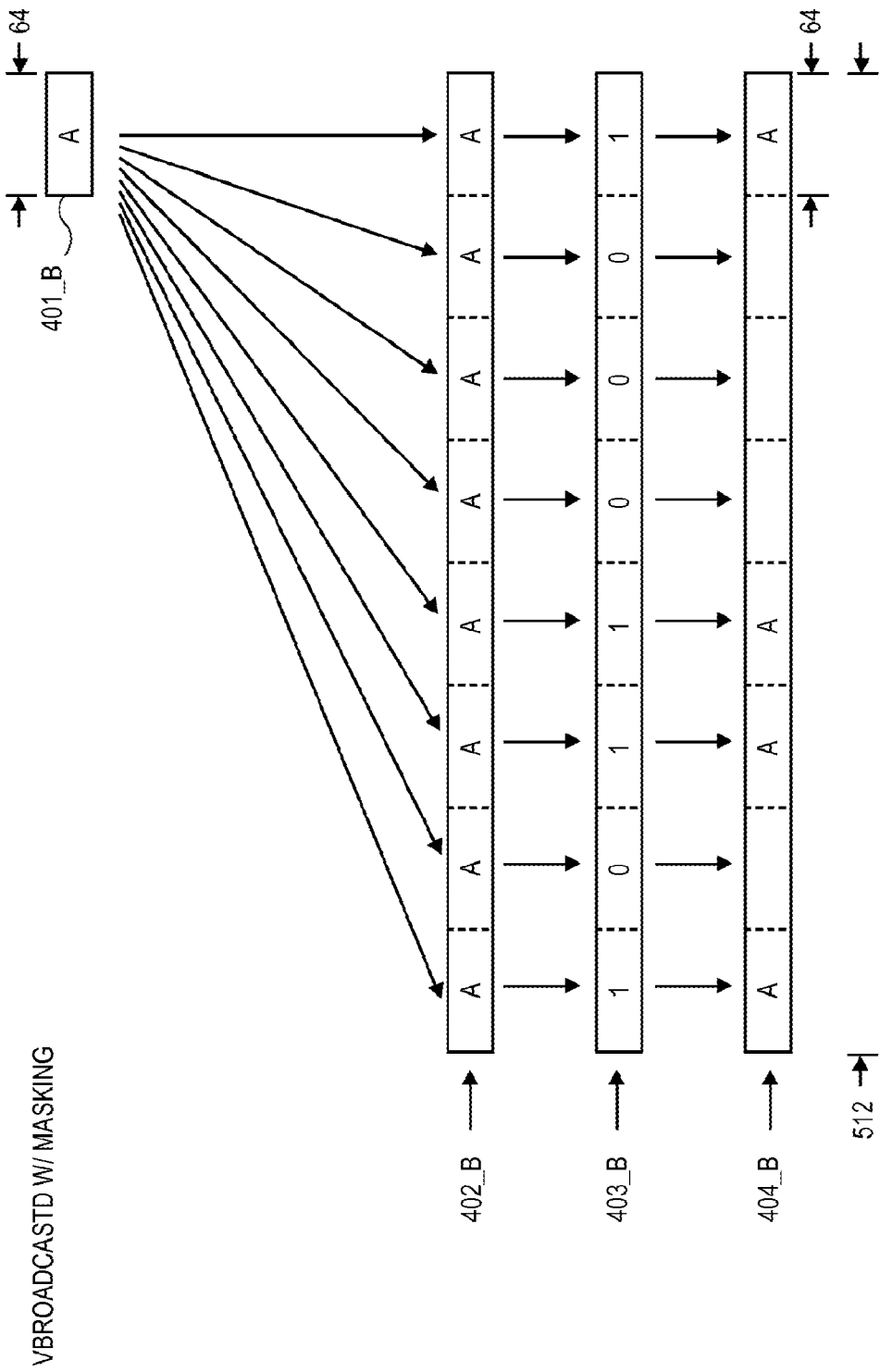

FIG. 4B shows a VBROADCASTSD instruction with masking. As observed in FIG. 4B, the VBROADCASTSD instruction replicates a 64 bit input data structure 401_B eight times to create a replication data structure 402_B. A masking layer 403_B applies a masking pattern to mask the replication data structure 402_B at 64 bit granularity to create the resultant data structure 404_B. It is understood that the resultant data structure is ultimately written to a destination register in vector register space. The address of the destination register is specified in a field of the instruction.

In an embodiment, the input data structure is a 64 bit double precision floating point value that is read from memory or is extracted from (e.g., the rightmost element of) a vector source operand fetched from vector register space such as register space 107 of FIG. 1. In either case, the instruction format includes a field that identifies where the data structure to be replicated is to be found.

FIG. 4C shows a VBROADCAST 32×2 instruction with masking. As observed in FIG. 4C, the VBROADCAST 32×2 instruction replicates a 64 bit input data structure 401_C eight times to create a replication data structure 402_C. The replicated 64 bit input data structure 401_C, however, is a pair of packed 32 bit single precision floating point values. The masking layer 403_C therefore applies a masking pattern at 32 bit granularity to create the resultant data structure 404_C. It is understood that the resultant data structure is ultimately written to a destination register in vector register space. The address of the destination register is specified in a field of the instruction.

In an embodiment, the input data structure is read from memory or is extracted from (e.g., the rightmost element of) a vector source operand fetched from vector register space such as register space 107 of FIG. 1. In either case, the instruction format includes a field that identifies where the data structure to be replicated is to be found.

Figure 4D:
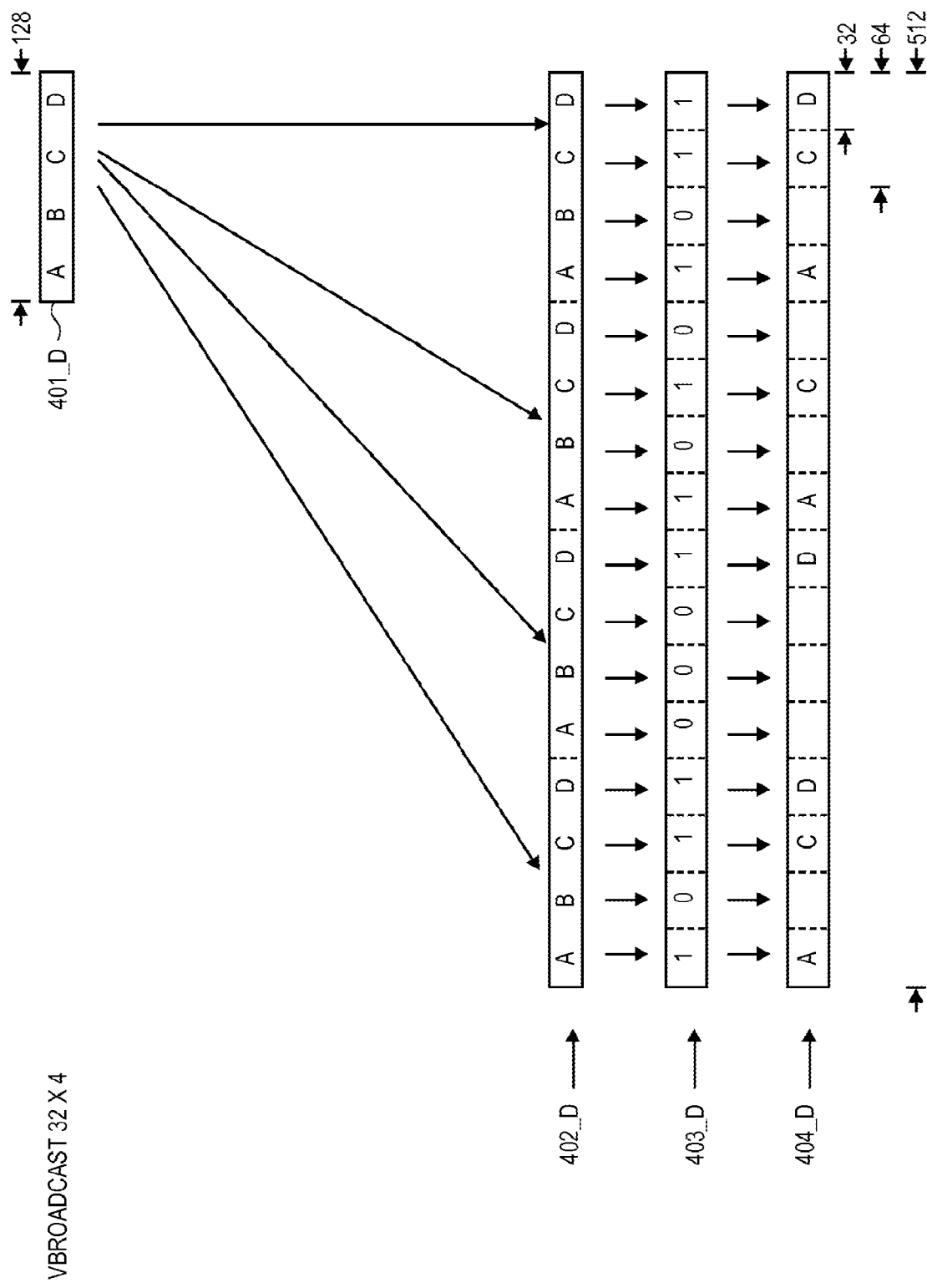

FIG. 4D shows a VBROADCAST 32×4 instruction with masking. As observed in FIG. 4D, the VBROADCAST 32×4 instruction replicates a 128 bit input data structure 401_D four times to create a replication data structure 402_D. The replicated 128 bit input data structure 401_D, however, is a quad word (foursome) of packed 32 bit single precision floating point values. The masking layer 403_D therefore applies a masking pattern at 32 bit granularity to create the resultant data structure 404_D. It is understood that the resultant data structure is ultimately written to a destination register in vector register space. The address of the destination register is specified in a field of the instruction.

In an embodiment, the input data structure is read from memory or is extracted from (e.g., the rightmost element of) a vector source operand fetched from vector register space such as register space 107 of FIG. 1. In either case, the instruction format includes a field that identifies where the data structure to be replicated is to be found.

Figure 4E:
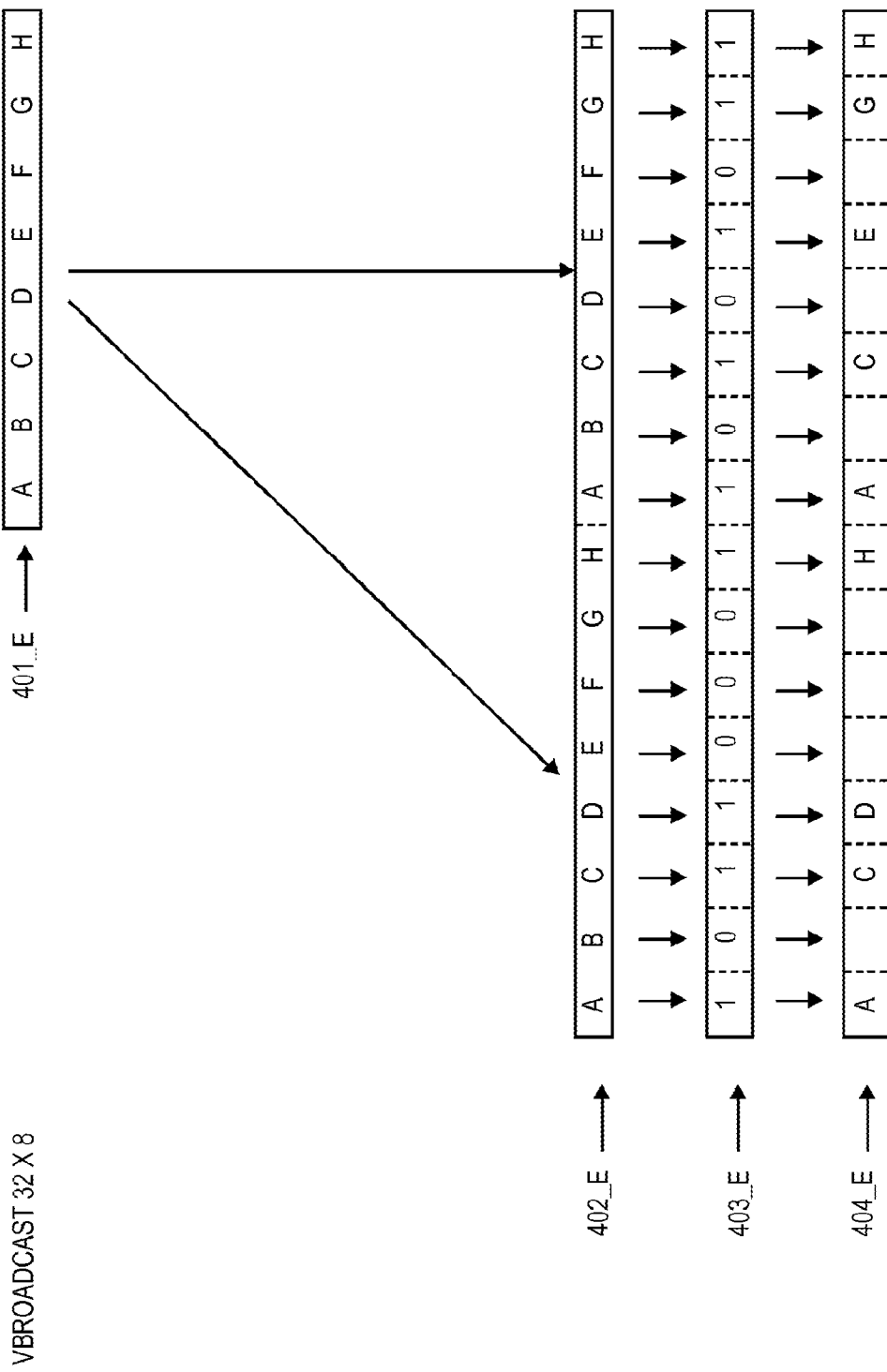

FIG. 4E shows a VBROADCAST 32×8 instruction with masking. As observed in FIG. 4E, the VBROADCAST 32×8 instruction replicates a 256 bit input data structure 401_E four times to create a replication data structure 402_E. The replicated 256 bit input data structure 401_E, however, is an octal word ("eightsome") of packed 32 bit single precision floating point values. The masking layer 403_E therefore applies a masking pattern at 32 bit granularity to create the resultant data structure 404_E. It is understood that the resultant data structure is ultimately written to a destination register in vector register space. The address of the destination register is specified in a field of the instruction.

In an embodiment, the input data structure is read from memory or is extracted from (e.g., the rightmost element of) a vector source operand fetched from vector register space such as register space 107 of FIG. 1. In either case, the instruction format includes a field that identifies where the data structure to be replicated is to be found.

Figure 4F:
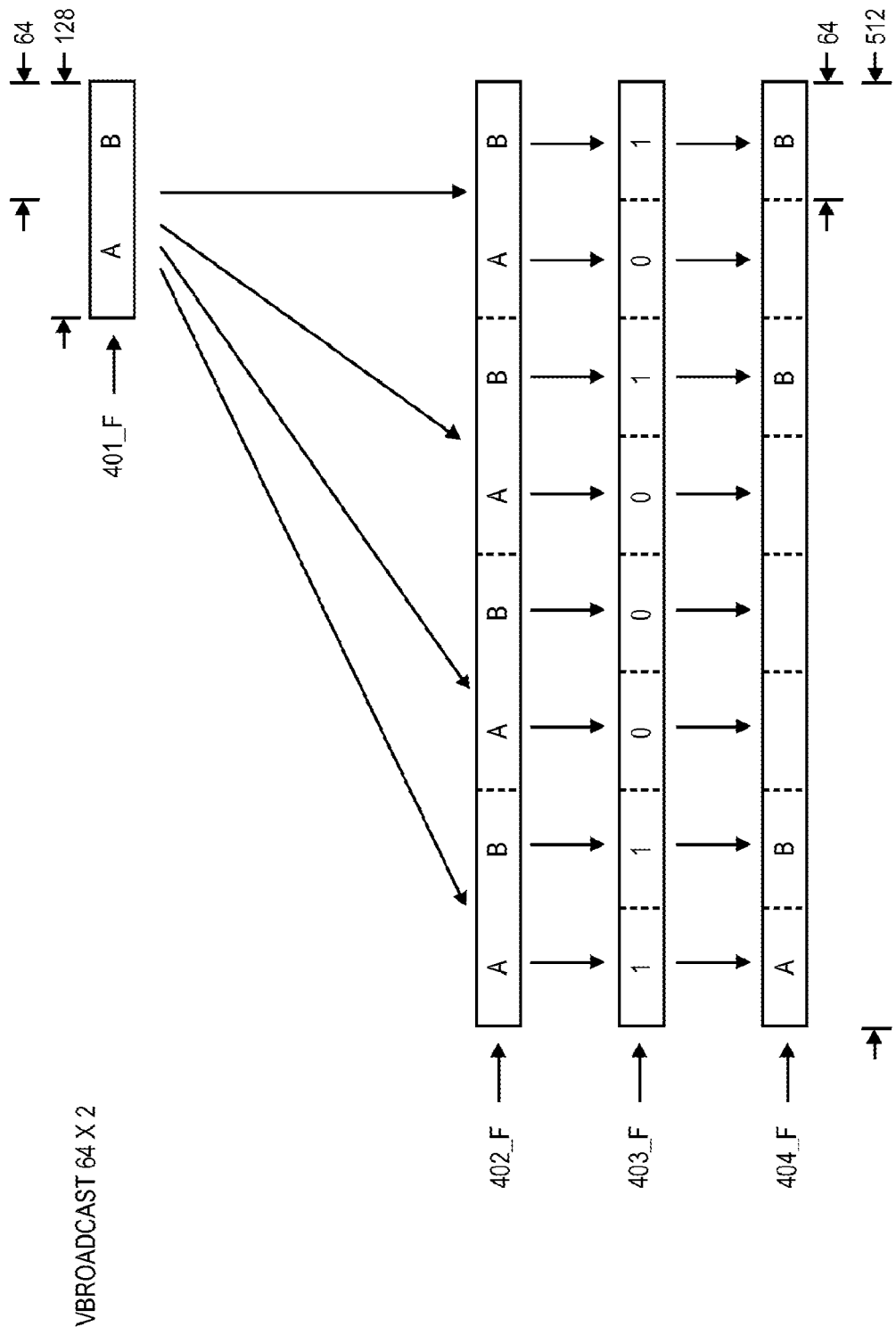

FIG. 4F shows a VBROADCAST 64×2 instruction with masking. As observed in FIG. 4F, the VBROADCAST 64×2 instruction replicates a 128 bit input data structure 401_F four times to create a replication data structure 402_F. The replicated 128 bit input data structure 401_F, however, is a pair of packed 64 bit double precision floating point values. The masking layer 403_F therefore applies a masking pattern at 64 bit granularity to create the resultant data structure 404_F. It is understood that the resultant data structure is ultimately written to a destination register in vector register space. The address of the destination register is specified in a field of the instruction.

In an embodiment, the input data structure is read from memory or is extracted from (e.g., the rightmost element of) a vector source operand fetched from vector register space such as register space 107 of FIG. 1. In either case, the instruction format includes a field that identifies where the data structure to be replicated is to be found.

Figure 4G:
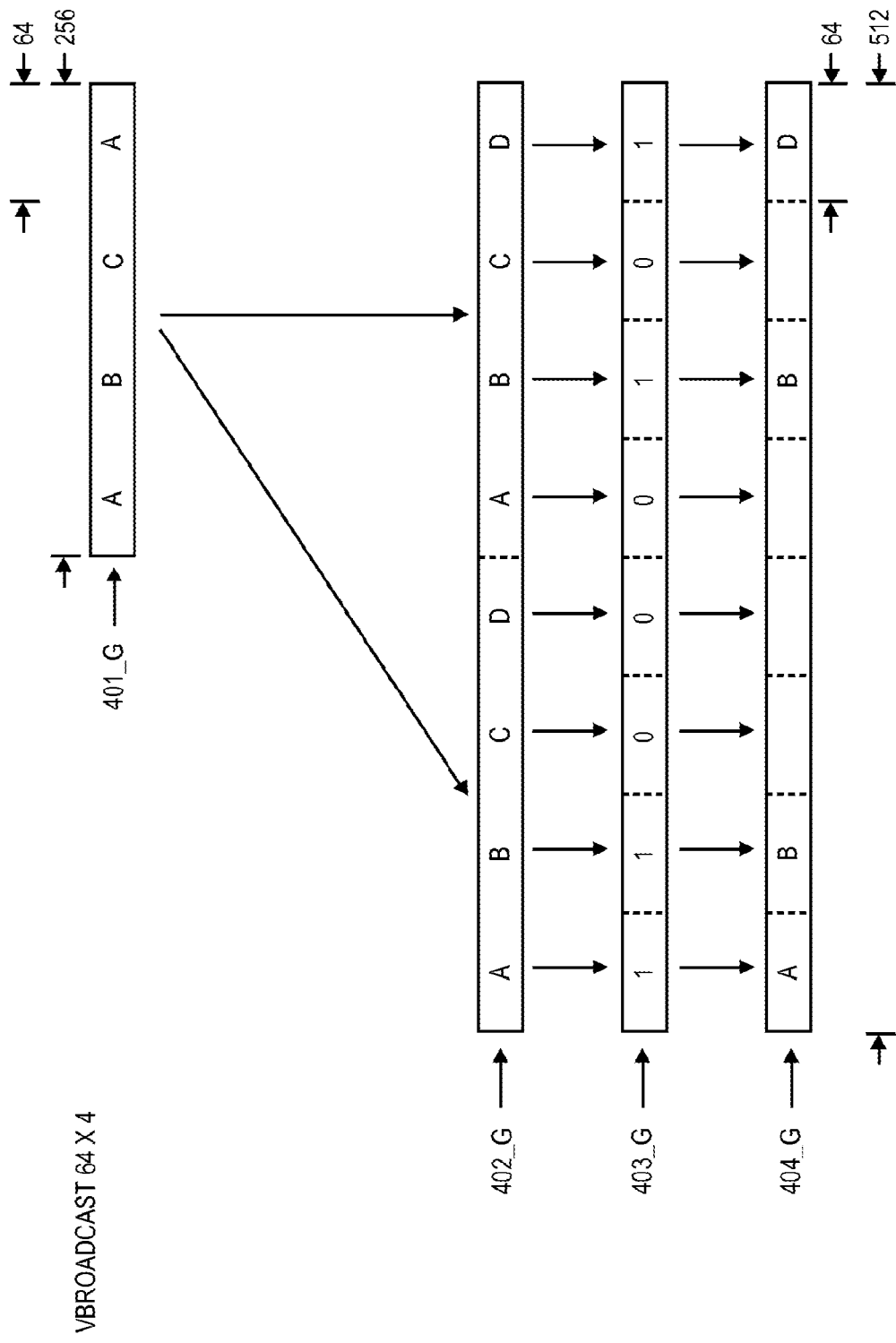

FIG. 4G shows a VBROADCAST 64×4 instruction with masking. As observed in FIG. 4G, the VBROADCAST 64×4 instruction replicates a 256 bit input data structure 401_G twice to create a replication data structure 402_G. The replicated 256 bit input data structure 401_G, however, is a quad word of packed 64 bit double precision floating point values. The masking layer 403_G therefore applies a masking pattern at 64 bit granularity to create the resultant data structure 404_G. It is understood that the resultant data structure is ultimately written to a destination register in vector register space. The address of the destination register is specified in a field of the instruction.

In an embodiment, the input data structure is read from memory or is extracted from (e.g., the rightmost element of) a vector source operand fetched from vector register space such as register space 107 of FIG. 1. In either case, the instruction format includes a field that identifies where the data structure to be replicated is to be found.

In the above discussion of the VBROADCAST 32×4, VBROADCAST 32×8, VBROADCAST 64×2 and VBROADCAST 64×4 instructions, the data structure to be replicated was described as being obtainable only from memory. Conceivably, however, these instructions could be extended to accept the data structure to be replicated from either memory or vector register space. As such, depending on implementation, the data fetch stage of a pipeline that supports these instructions may be coupled to memory or memory and register space.

Moreover, the discussions of each of the VBROAD-CASTSS with masking, VBROADCASTSD with masking, VBROADCAST 32×2, VBROADCAST 32×4, VBROADCAST 32×8, VBROADCAST 64×2 and VBROADCAST 64×4 instructions were described as only supporting floating point data values. Conceivably, these instructions may be extended to process integer as well as floating point data values. Here, register space 102 of FIG. 1 may include a first portion dedicated to storing floating point values and another portion dedicated to storing floating point values. Without the extension to integer values, the data fetch and write back stages of the pipeline are coupled to floating point register space but not integer register space with respect to the manner in which these instructions are processed. By contrast, the data fetch and write back stages can be coupled to either (depending on the decoding of the instruction), if these instructions are designed to support both data types.

Figure 5A:
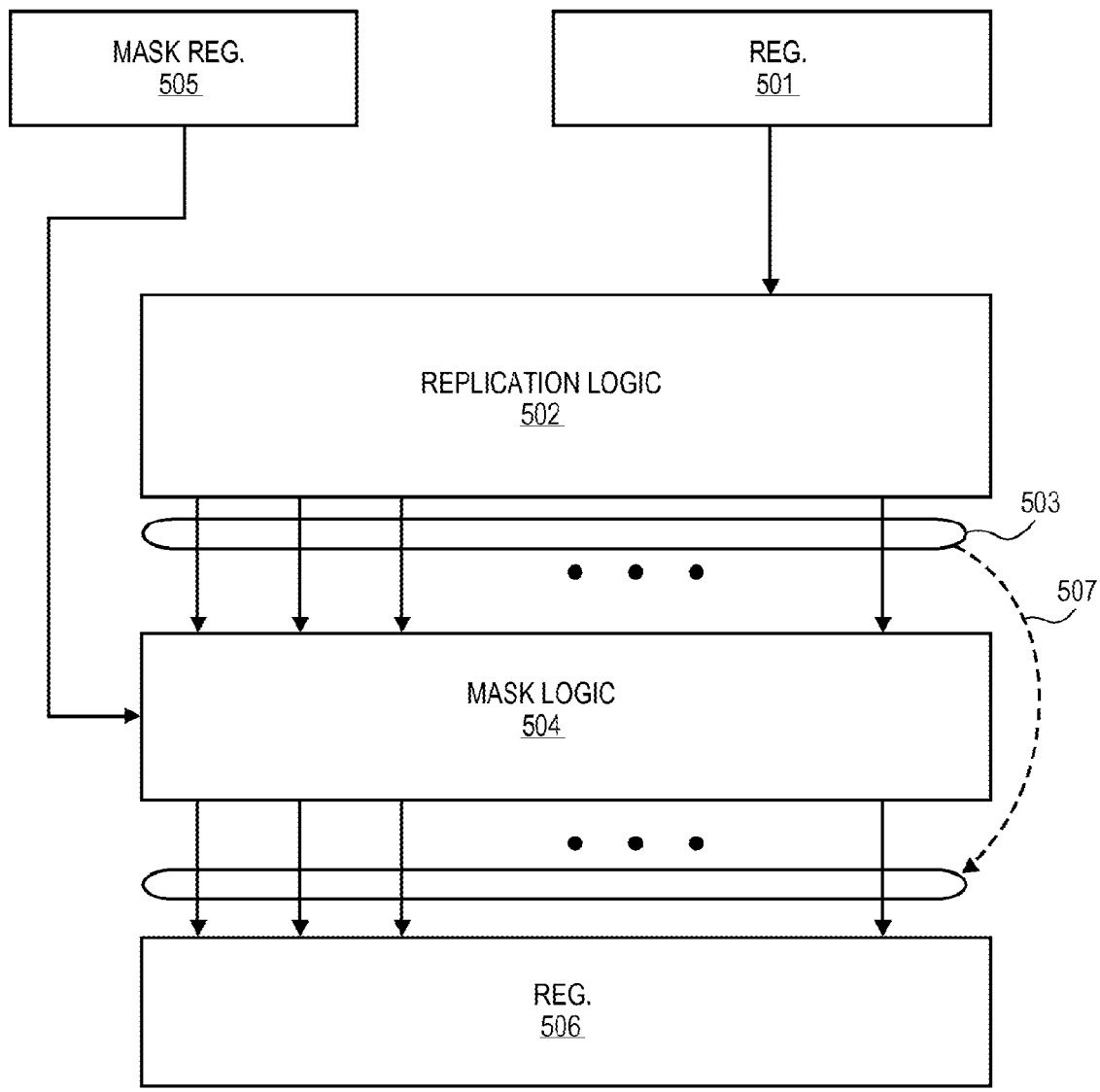
FIGS. 5A and 5B pertain to execution logic circuitry for implementing the improved VBROADCAST instructions.

FIG. 5A shows a logic design for a execution that can implement any combination (including all) of the instructions discussed above in FIGS. 4A through 4F. Referring to FIG. 5A, a first register 501 holds the data structure to be replicated. Notably the size of the first register 501 should be large enough to hold the largest data structure it is expected to be able to replicate. Moreover, the first register 501 also be located at the back end of a data fetch stage in a pipeline. For purposes of this application such a register can be considered to be part of the execution unit. The first register 501 is coupled to replication logic circuitry 502 that replicates content within the first register to produce at its output 503 the replication data structure consistent with the instruction being executed. For those implementations that are micro-coded, the term "logic circuitry" and the like for the replication logic circuitry 502 would include the micro-code and the logic that acts in response to the micro-code.

The output 503 of the replication logic circuitry is coupled to masking logic 504 which receives a masking pattern from register 505 to apply a mask to the replication data structure to create the resultant data structure in register 506. Depending on implementation, register 506 may correspond to a register within vector register space 107, or register 506 may be a register that is internal to the execution unit and that is populated with the contents of the destination register (e.g., during the data fetch stage) and is then written back to the same destination register after the mask logic has written the result into it.

In a further embodiment, the execution unit logic circuit is designed to support not only any/all of the instructions of FIGS. 4A through 4G, but also, any/all of the prior art instructions of FIGS. 3A through 3D. In this case, because the prior art instructions of FIGS. 3A through 3D do not support masking, there exists a bypass path 507 that circumvents the masking logic 504 when these instructions are being executed.

Although the descriptions of the above instructions included specific bit widths for the data values, the data structure to be replicated and the size of the result, those of ordinary skill will recognize that the concepts described therein could be extended to different respective widths.

Figure 5B:
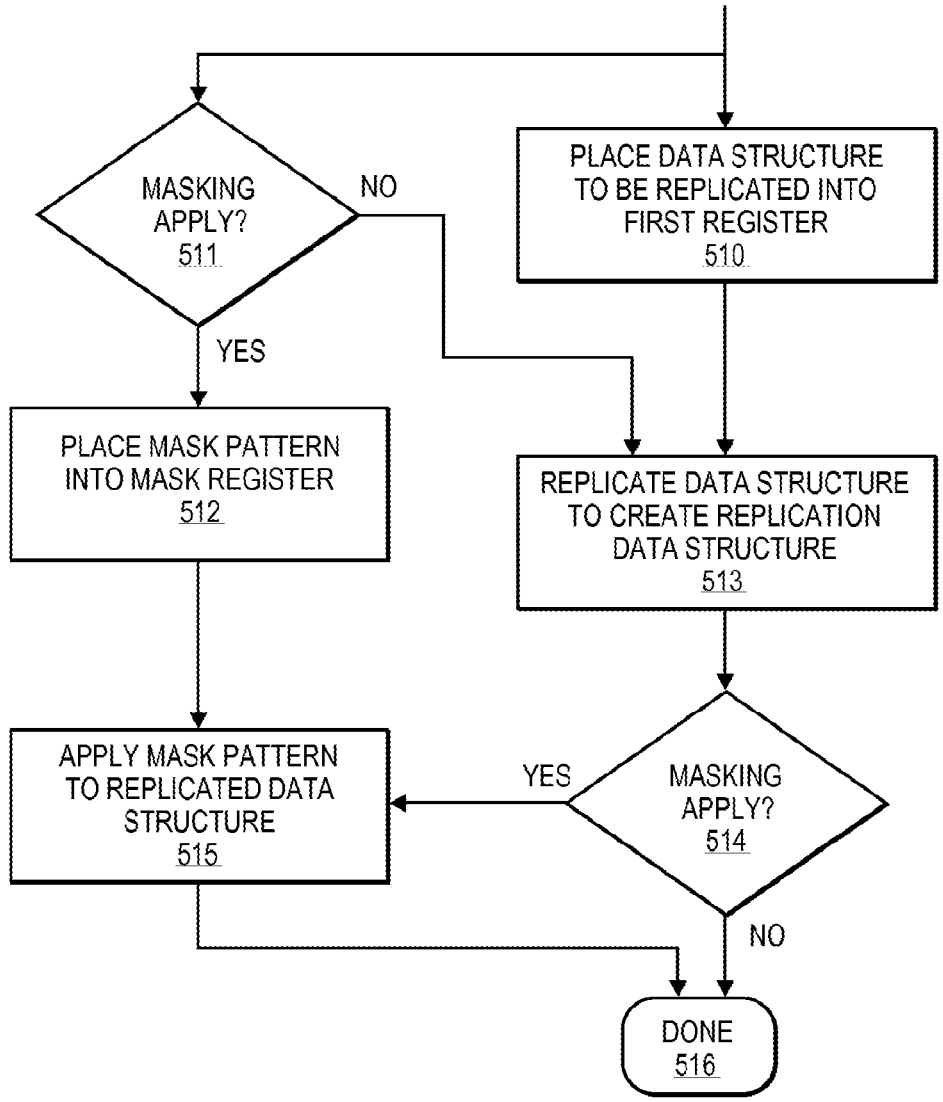

FIG. 5B shows a methodology that can be performed by the logic circuitry of FIG. 5A. A data structure to be replicated is placed in a first register 510 and, if masking applies 511, a mask pattern is placed in a second register 512. The data structure is then replicated consistent with the instruction being executed to create a replication data structure 513. If masking applies 514 the mask pattern is applied to the replication data structure 515 to create the resultant. If masking does not apply the resultant is the replication data structure 516.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
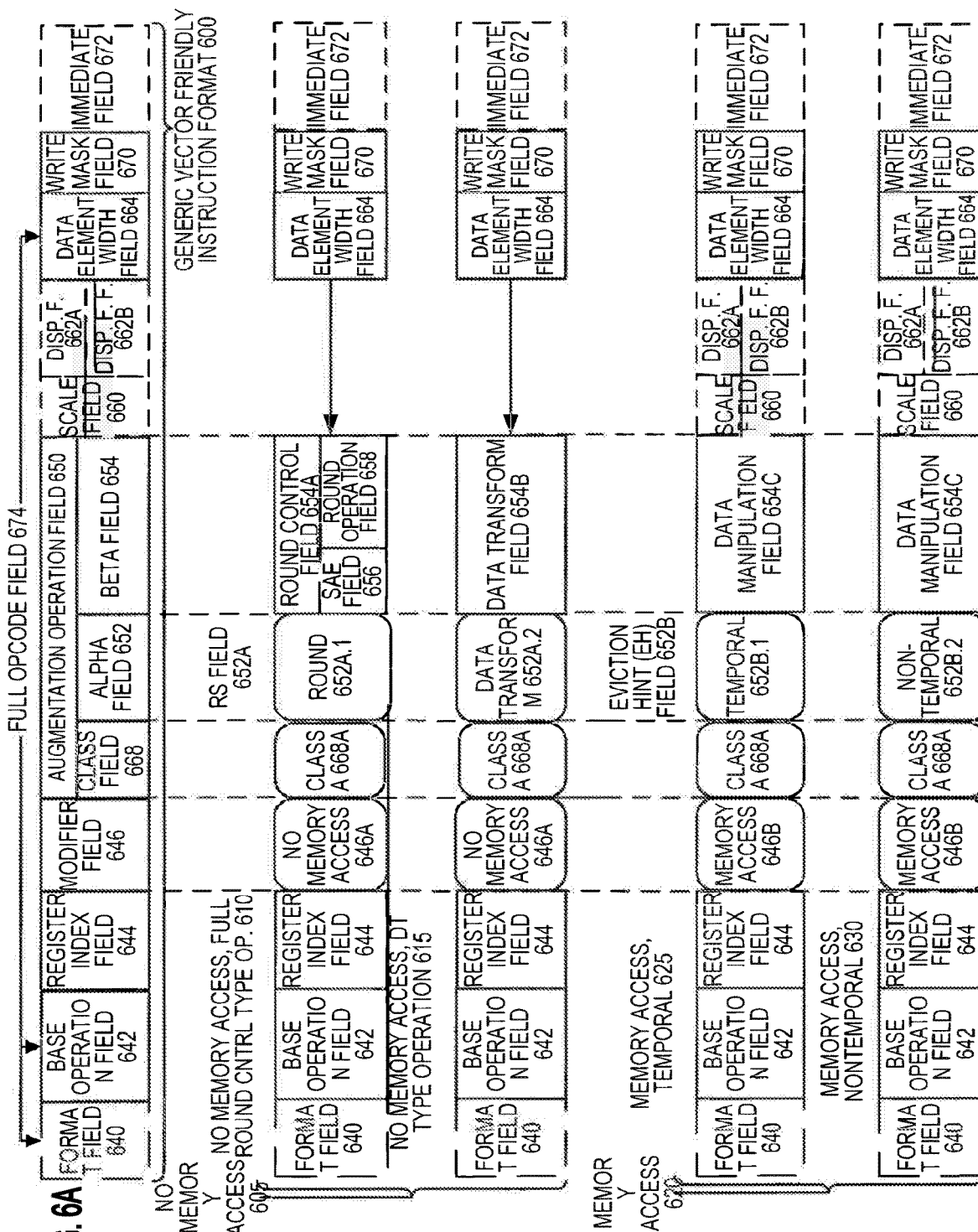
FIGS. 6A-6B are block diagrams illustrating a generic vector friendly instruction format and instruction templates thereof according to embodiments of the invention.
Figure 6B:
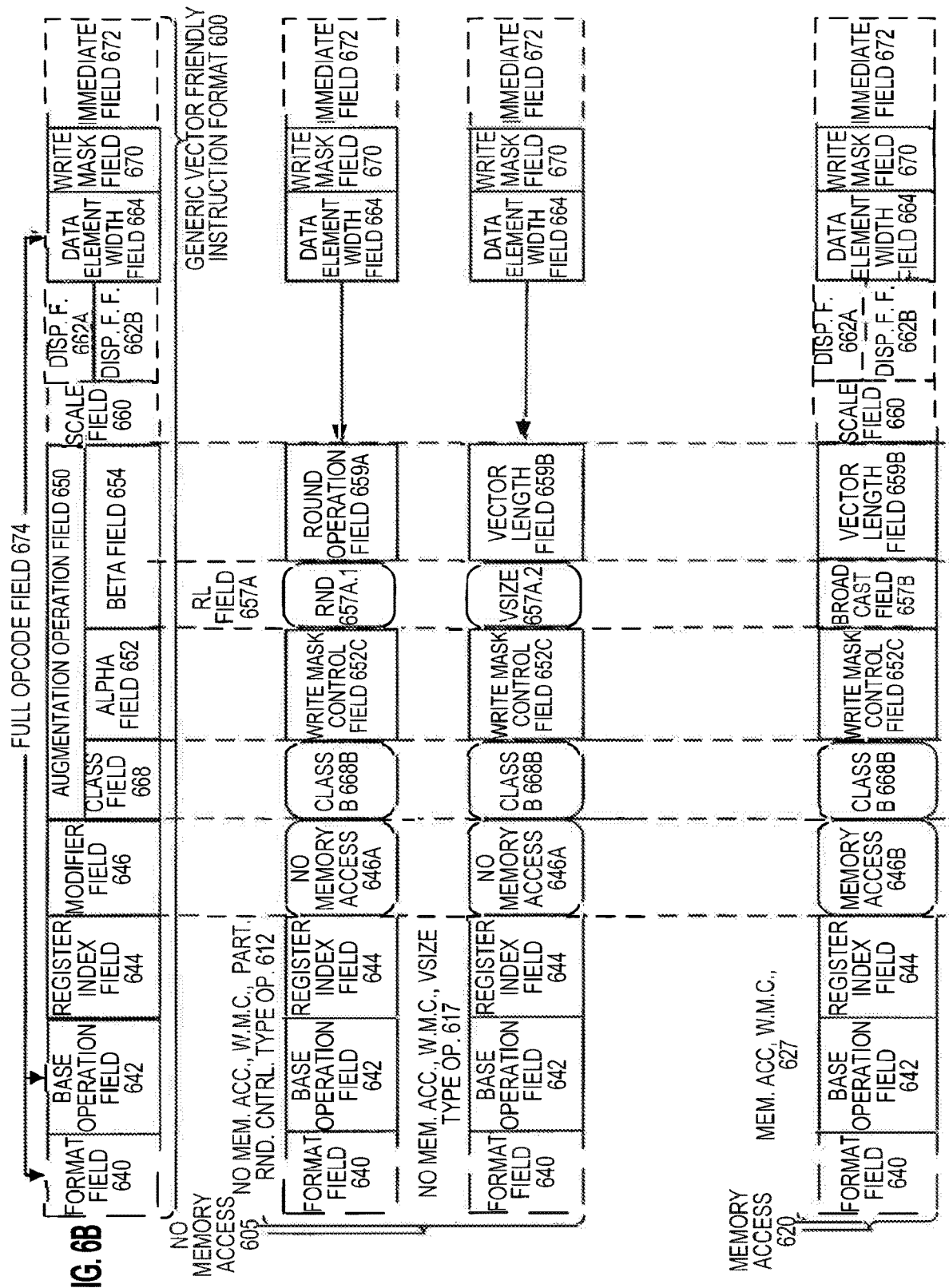

FIGS. 6A-6B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B. In conjunction with the discussions above, in an embodiment, referring to the format details provided below in FIGS. 6A-B and 7, either a non memory access instruction type 605 or a memory access instruction type 620 may be utilized. Addresses for the read mask(s), input vector operand(s) and destination may be identified in register address field 644 described below. In a further embodiment the read mask and the write masks are encoded in the EVEX.kkk field.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses 2scale*index+base).

Displacement Field 662A—its content is used as part of memory address generation (e.g., for address generation that uses 2scale*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the invention where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the invention where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIGS. 7A-7D are block diagrams illustrating an exemplary specific vector friendly instruction format according to embodiments of the invention. FIGS. 7A-7D show a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIGS. 7A-7D map are illustrated.

It should be understood that, although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between -128 and 127 bytes offsets; in terms of 64 byte cache lines, disp8 uses 8 bits that can be set to only four really useful values -128, -64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 672 operates as previously described.

Full Opcode Field

FIG. 7B is a block diagram illustrating the fields of the specific vector friendly instruction format 700 that make up the full opcode field 674 according to one embodiment of the invention. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the invention. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
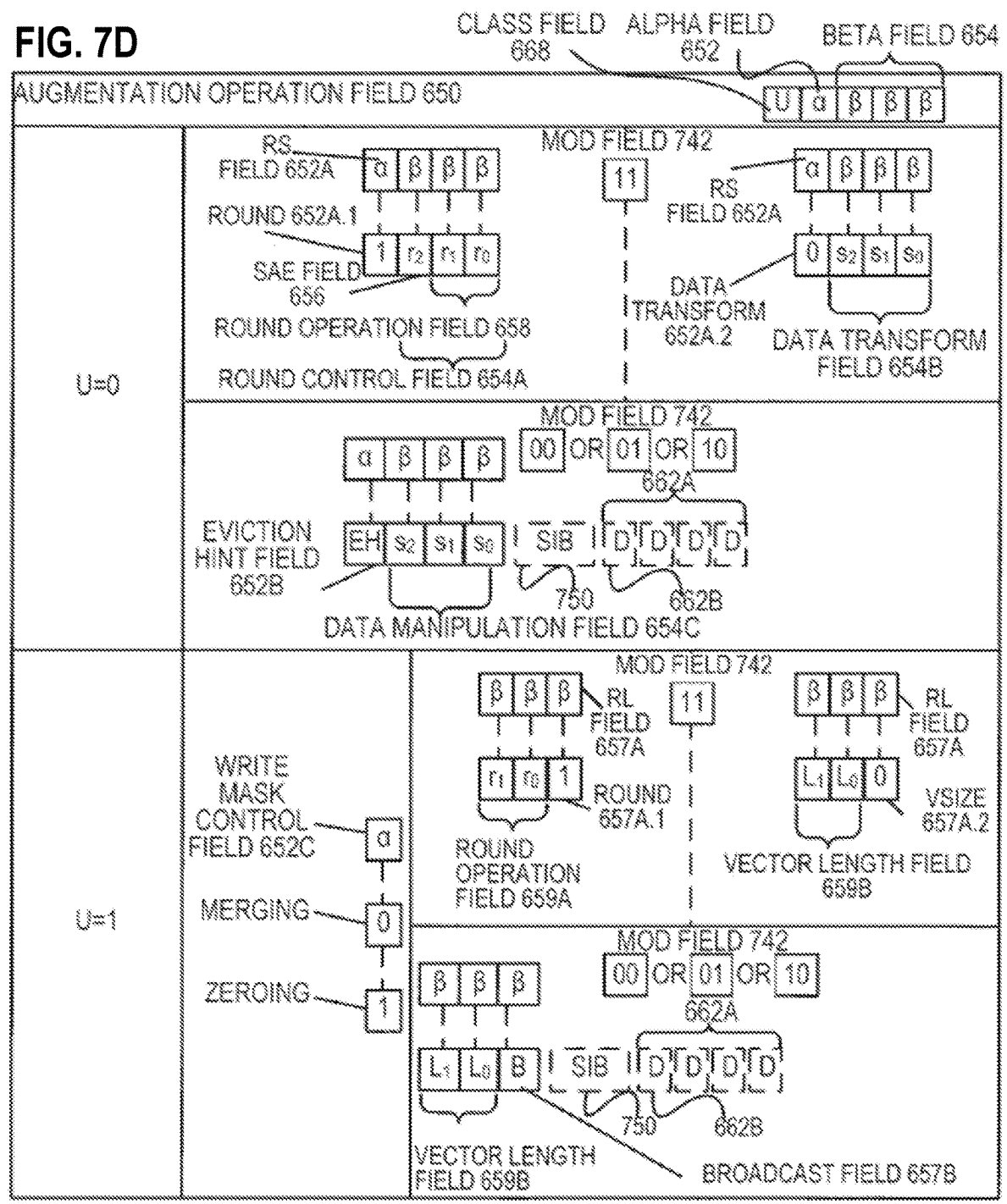

FIG. 7D is a block diagram illustrating the fields of the specific vector friendly instruction format 700 that make up the augmentation operation field 650 according to one embodiment of the invention. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—SO) is interpreted as the RL field 657A; when it contains a 1 (round 657A.1) the rest of the beta field 654 (EVEX byte 3, bit [6-5]—S2-1) is interpreted as the round operation field 659A, while when the RL field 657A contains a 0 (VSIZE 657.A2) the rest of the beta field 654 (EVEX byte 3, bit [6-5]—S2-1) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction Templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 9A, 9B:
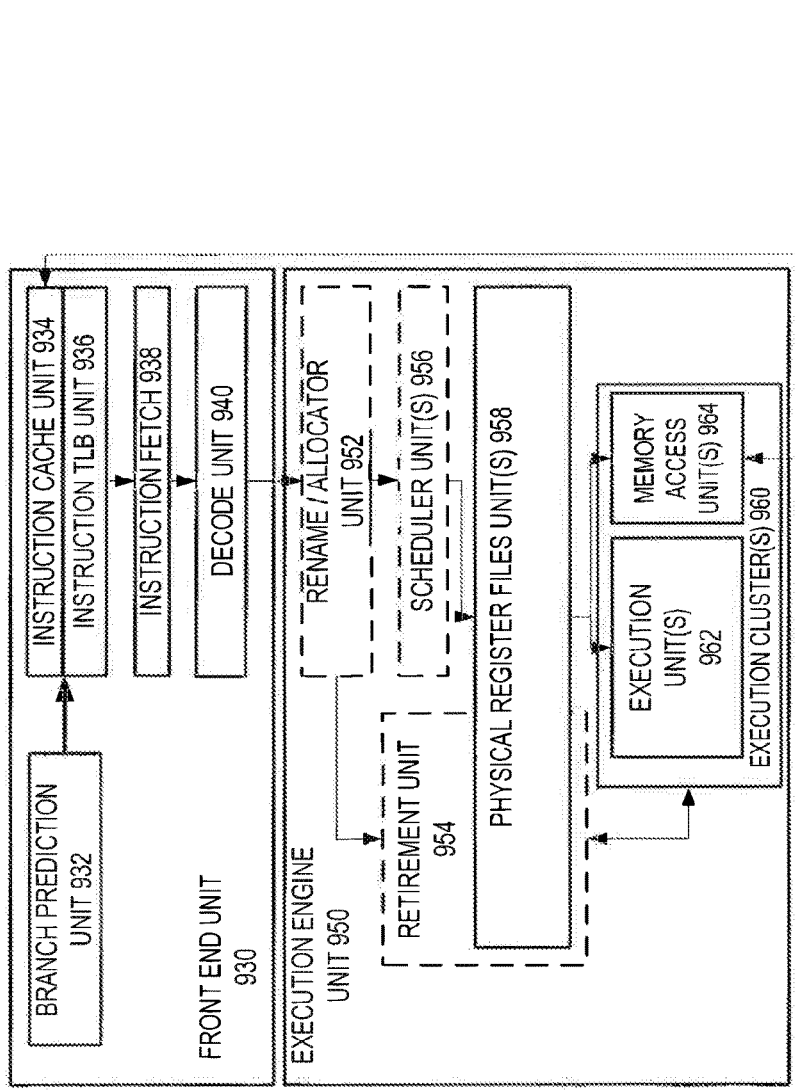
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
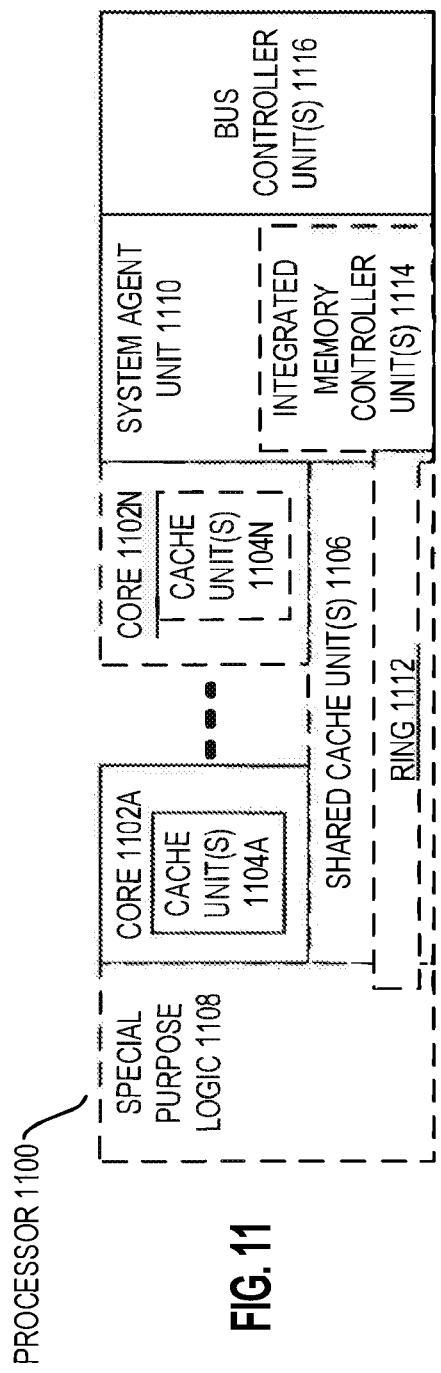
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
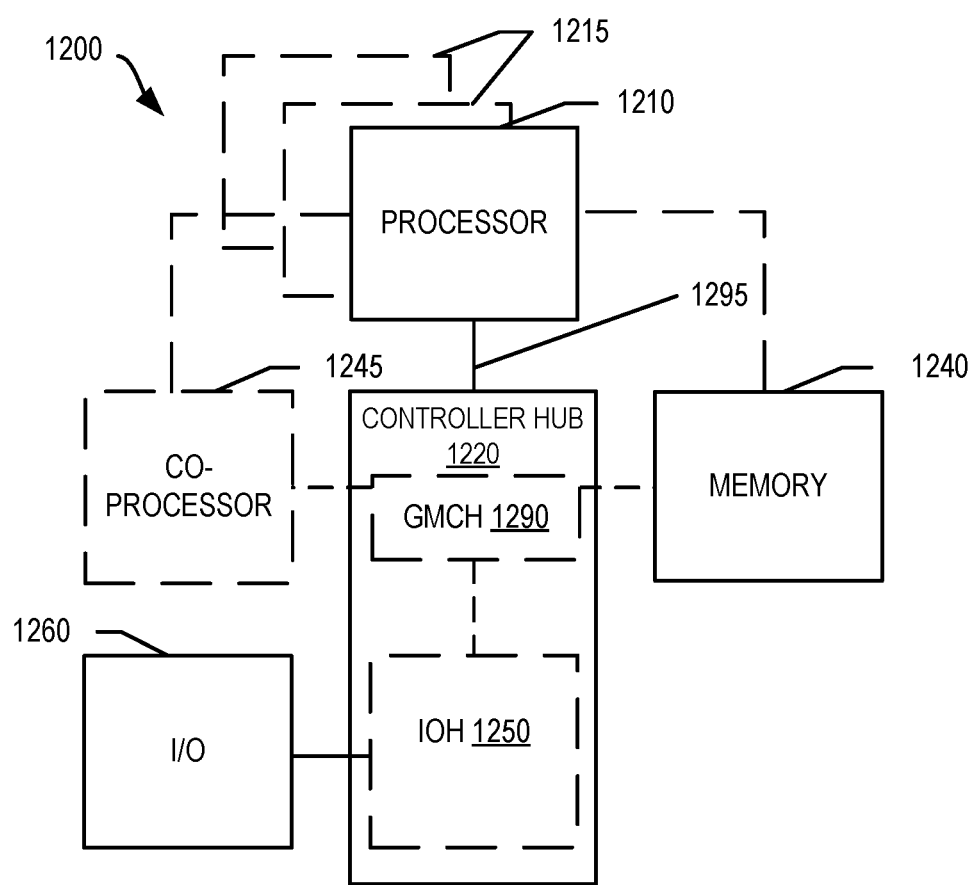
FIG. 12 is a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
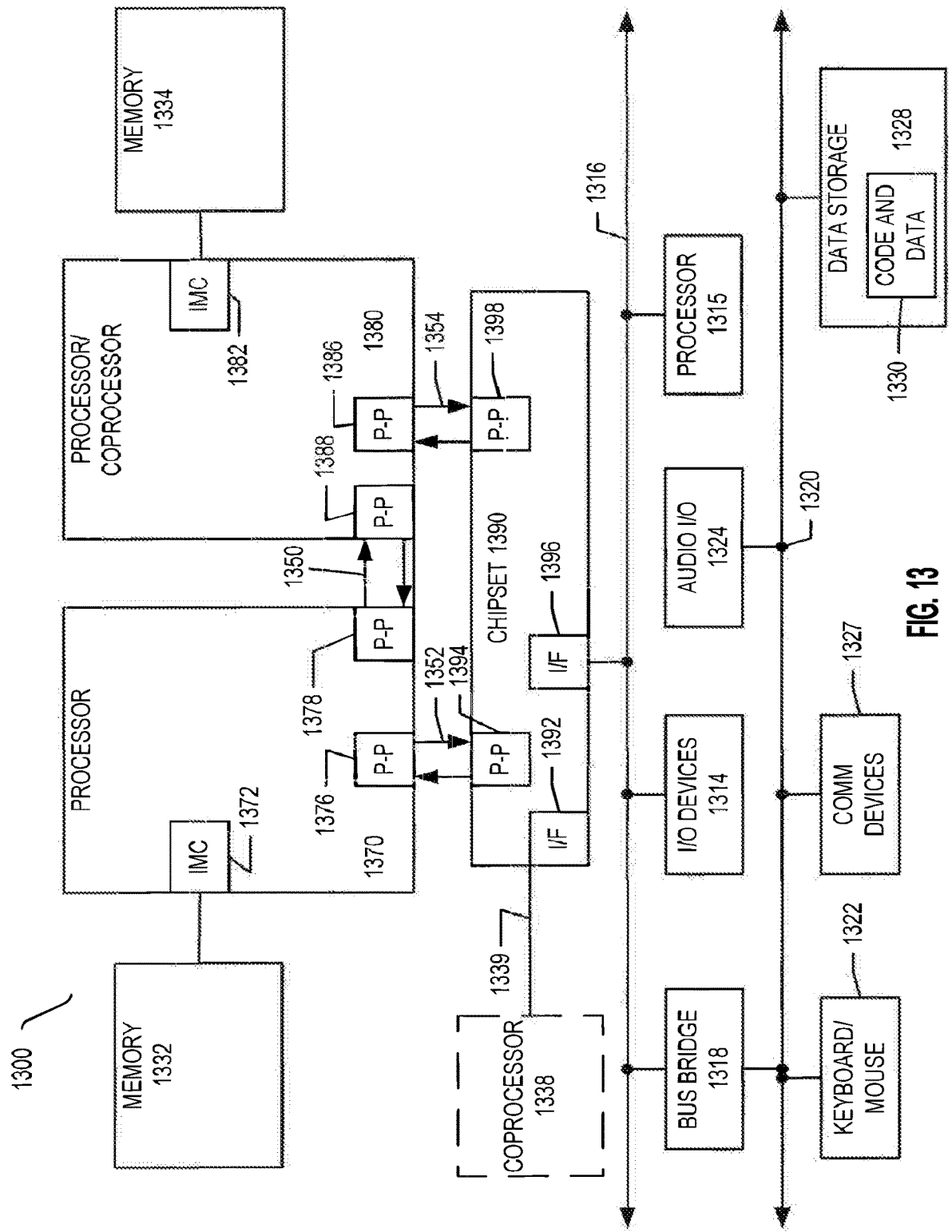
FIG. 13 is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
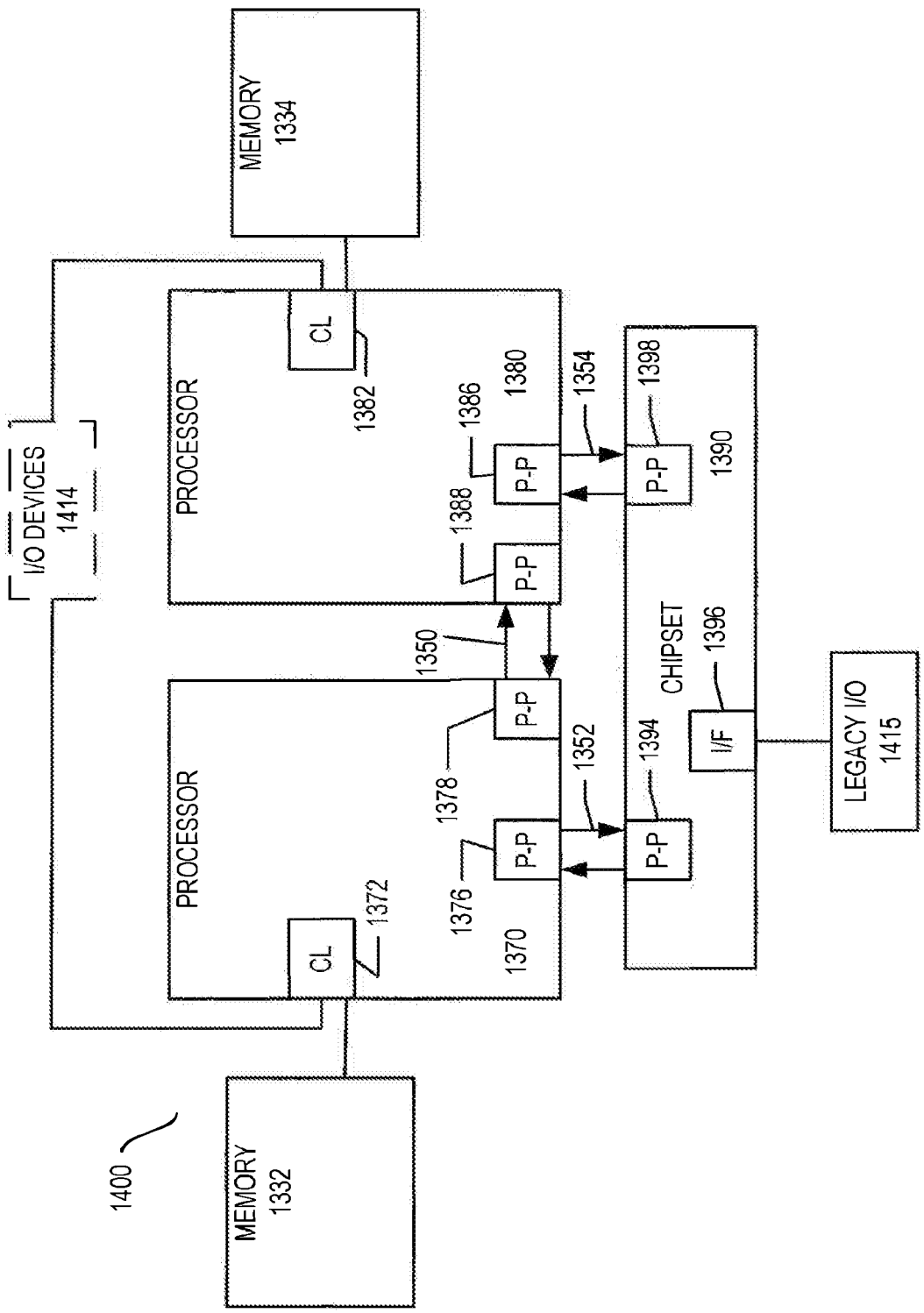
FIG. 14 is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
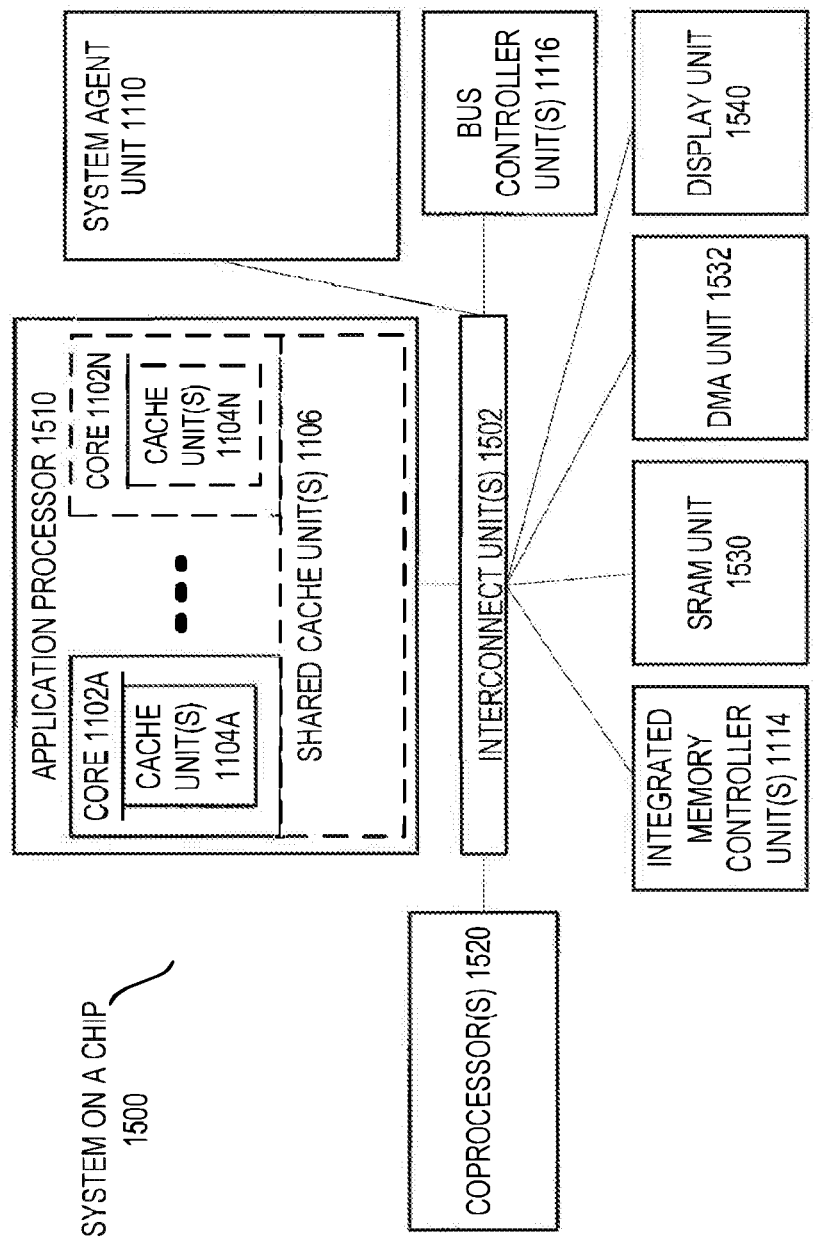
FIG. 15 is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A processor core comprising:
multiple levels of cache, including a Level 2 (L2) cache;
a plurality of vector registers;
a plurality of mask registers;
a decode unit circuit to decode a first instruction and a second instruction,
  the first instruction having fields to specify a base and an index corresponding to a location in a memory of a first 128-bit packed data structure having two 64-bit elements, having a field to specify a mask register of the plurality of mask registers as a source of a first mask, and having a field to specify a destination register of the plurality of vector registers,
  the second instruction having fields to specify a base and an index corresponding to a location in the memory of a second 128-bit packed data structure having four 32-bit elements, having a field to specify a mask register of the plurality of mask registers as a source of a second mask, and having a field to specify a destination register of the plurality of vector registers; and
an execution unit circuit coupled with the decode unit circuit, the plurality of vector registers, and the plurality of mask registers,
  the execution unit circuit to perform the first instruction to:
    load at least one 64-bit element of the first 128-bit packed data structure,
    generate a first masked replication data structure from the first 128-bit packed data structure based on applying the first mask at a 64-bit data element granularity, and with zeroed masking where masked out elements are zeroed, and
    store a first result including the first masked replication data structure in the destination register specified by the first instruction, wherein a length of the first masked replication data structure is a multiple of 128-bits and is the same as the destination register specified by the first instruction, and
  the execution unit circuit to perform the second instruction to:
    load at least one 32-bit element of the second 128-bit packed data structure,
    generate a second masked replication data structure from the second 128-bit packed data structure based on applying the second mask at a 32-bit data element granularity, and with the zeroed masking where masked out elements are zeroed, and
    store a second result including the second masked replication data structure in the destination register specified by the second instruction, wherein a length of the second masked replication data structure is a multiple of 128-bits and is the same as the destination register specified by the second instruction.

2. The processor core of claim 1, wherein the processor core also allows using the plurality of mask registers for merged masking in which masked out elements retain initial values they had prior to the merged masking.

3. The processor core of claim 1, wherein the execution unit circuit when performing the first instruction is not to load a masked out element of the first 128-bit packed data structure.

4. The processor core of claim 1, wherein the mask registers are in a set of registers with a register that cannot be used as a mask.

5. The processor core of claim 1, wherein the plurality of mask registers are 64-bit mask registers, and wherein the vector registers are 512-bit vector registers.

6. The processor core of claim 1, wherein the first result has at least 512-bits and the second result has at least 512-bits.

7. The processor core of claim 1, wherein the plurality of mask registers are eight mask registers.

8. The processor core of claim 1, wherein the execution unit circuit includes: a replication logic circuit to replicate a data structure; and a masking logic circuit to apply a mask to a data structure.

9. The processor core of claim 1, wherein the execution unit circuit is included in an out-of-order portion of the processor core.

10. The processor core of claim 1, wherein the processor core is a reduced instruction set computing (RISC) processor core.

11. The processor core of claim 1, further comprising a plurality of 64-bit general-purpose registers.

12. A processor core comprising:
multiple levels of cache, including a Level 2 (L2) cache;
a plurality of vector registers;
a plurality of mask registers;
a decode unit circuit to decode an instruction, the instruction having fields to specify a base and an index corresponding to a location in a memory of a 128-bit packed data structure having two 64-bit elements, having a field to specify a mask register of the plurality of mask registers as a source of a mask, and having a field to specify a destination register of the plurality of vector registers; and
an execution unit circuit coupled with the decode unit circuit, the plurality of vector registers, and the plurality of mask registers, the execution unit circuit to perform the instruction to:

load at least one 64-bit element of the 128-bit packed data structure, generate a masked replication data structure from the 128-bit packed data structure based on applying the mask at a 64-bit data element granularity, and with zeroed masking where masked out elements are zeroed, and store a result including the masked replication data structure in the destination register, wherein a length of the masked replication data structure is a multiple of 128-bits and is the same as the destination register.

13. The processor core of claim 12, wherein the processor core also allows using the plurality of mask registers for merged masking in which masked out elements retain initial values they had prior to the merged masking.

14. The processor core of claim 12, wherein the execution unit circuit when performing the instruction is not to load a masked out element of the 128-bit packed data structure.

15. The processor core of claim 12, wherein the mask registers are in a set of registers with a register that cannot be used as a mask.

16. The processor core of claim 12, wherein the plurality of mask registers are 64-bit mask registers, and wherein the vector registers are 512-bit vector registers.

17. The processor core of claim 12, wherein the execution unit circuit includes: a replication logic circuit to replicate a data structure; and a masking logic circuit to apply a mask to a data structure.

18. The processor core of claim 12, wherein the execution unit circuit is included in an out-of-order portion of the processor core, and wherein the processor core is a reduced instruction set computing (RISC) processor core.

19. A method comprising:
decoding a first instruction having fields specifying a base and an index corresponding to a location in a memory of a first 128-bit packed data structure having two 64-bit elements, having a field specifying a mask register of a plurality of mask registers as a source of a first mask, and having a field specifying a destination register of a plurality of vector registers;

performing the first instruction, including:
loading at least one 64-bit element of the first 128-bit packed data structure,
generating a first masked replication data structure from the first 128-bit packed data structure based on applying the first mask at a 64-bit data element granularity, and with zeroed masking where masked out elements are zeroed, and
storing a first result including the first masked replication data structure in the destination register specified by the first instruction, wherein a length of the first masked replication data structure is a multiple of 128-bits and is the same as the destination register specified by the first instruction;

decoding a second instruction having fields specifying a base and an index corresponding to a location in the memory of a second 128-bit packed data structure having four 32-bit elements, having a field specifying a mask register of the plurality of mask registers as a source of a second mask, and having a field specifying a destination register of the plurality of vector registers; and performing the second instruction, including:
loading at least one 32-bit element of the second 128-bit packed data structure,
generating a second masked replication data structure from the second 128-bit packed data structure based on applying the second mask at a 32-bit data element granularity, and with the zeroed masking where masked out elements are zeroed, and
storing a second result including the second masked replication data structure in the destination register specified by the second instruction, wherein a length of the second masked replication data structure is a multiple of 128-bits and is the same as the destination register specified by the second instruction.

20. The method of claim 19, further comprising not loading a masked out element of the first 128-bit packed data structure when performing the first instruction.

* * * * *